(12) United States Patent
Lin et al.

(10) Patent No.: US 11,540,367 B2
(45) Date of Patent: *Dec. 27, 2022

(54) ELECTRICAL LIGHT SET CIRCUIT, LIGHT STRIP AND CONTROL APPARATUS THEREFOR

(71) Applicant: FUJIAN YIBAO OPTOELECTRONICS TECHNOLOGY CO., LTD., Nan'an (CN)

(72) Inventors: Jiayang Lin, Nan'an (CN); Baowen Lin, Nan'an (CN)

(73) Assignee: FUJIAN YIBAO OPTOELECTRONICS TECHNOLOGY CO., LTD., Nan'an (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/563,952

(22) Filed: Dec. 28, 2021

(65) Prior Publication Data

US 2022/0124885 A1 Apr. 21, 2022

Related U.S. Application Data

(63) Continuation-in-part of application No. 16/664,752, filed on Oct. 25, 2019, now Pat. No. 11,399,419.
(Continued)

(30) Foreign Application Priority Data

May 2, 2018 (CN) .......................... 201820642837.X
May 3, 2018 (CN) .......................... 201820645655.8

(Continued)

(51) Int. Cl.
H05B 45/20 (2020.01)
F21S 4/20 (2016.01)
(Continued)

(52) U.S. Cl.
CPC ................. *H05B 45/20* (2020.01); *F21S 4/20* (2016.01); *H05B 45/42* (2020.01); *H05B 45/48* (2020.01); *H05B 47/16* (2020.01)

(58) Field of Classification Search
CPC ........ H05B 45/10; H05B 45/20; H05B 45/42; H05B 45/48; H05B 47/10; H05B 47/16; F21S 4/20
See application file for complete search history.

(56) References Cited

U.S. PATENT DOCUMENTS

2004/0051474 A1* 3/2004 Wong .................... A41D 27/085
315/291
2015/0091454 A1* 4/2015 McRae .................. H05B 45/20
315/200 R \* cited by examiner

*Primary Examiner* — Jimmy T Vu
(74) *Attorney, Agent, or Firm* — Danton K. Mak

(57) ABSTRACT

An electrical load set circuit and apparatus having at least three control signal lines arranged in parallel, a pair of polarized electrical loads connected between two of the signal lines, and another electrical load connected between a different control signal line and one of the polarized loads. Individual ones of the electrical loads can be selectively activated without requiring an additional common (ground) line. At least two of the control signal lines can be kept in a floating state. A light strip includes plural light set circuits spaced along the control signal lines. In another variation, first and second light points are spaced along the three control signal lines, each including three different color LEDs respectively. Further variations include display devices having rotating and slit patterns of illumination.

28 Claims, 20 Drawing Sheets

Related U.S. Application Data which is a continuation of application No. 16/172,693, filed on Oct. 26, 2018, now Pat. No. 10,462,872, which is a continuation-in-part of application No. 16/022,285, filed on Jun. 28, 2018, now Pat. No. 10,117,299.

(30) Foreign Application Priority Data

| Jul. 25, 2018 | (CN) | ......................... 201821186633.6 |
| Sep. 25, 2018 | (CN) | ......................... 201821564179.3 |
| Dec. 31, 2020 | (CN) | ......................... 202023325659.4 |
| Jun. 4, 2021 | (CN) | ......................... 202121247615.6 |

(51) Int. Cl.
*H05B 45/48* (2020.01)
*H05B 45/42* (2020.01)
*H05B 47/16* (2020.01)

ELECTRICAL LIGHT SET CIRCUIT, LIGHT STRIP AND CONTROL APPARATUS THEREFOR

CROSS-REFERENCE TO RELATED APPLICATIONS

The present application is a continuation-in-part of pending U.S. patent application Ser. No. 16/664,752 titled "Electrical Load Set Circuit, Light Strip, and Control Apparatus Therefor," filed Oct. 25, 2019, which is a continuation of U.S. patent application Ser. No. 16/172,693 titled "Electrical Load Set Circuit, Light Strip, and Control Apparatus Therefor," filed Oct. 26, 2018 and issued as U.S. Pat. No. 10,462,872 on Oct. 29, 2019, which is a continuation-in-part of U.S. patent application Ser. No. 16/022,285 titled "Light Load Set Circuit, Light Strip And Control Apparatus Therefor," filed Jun. 28, 2018 and issued as U.S. Pat. No. 10,117,299 on Oct. 30, 2018, which claims priority from Chinese Patent Application No. 201820642837.X titled "A Light Set Circuit, A Light Strip and a Light Source Component," filed May 2, 2018 and Chinese Patent Application No. 201820645655.8 titled "A Light Set Circuit, A Light Strip and Light Source Component," filed May 3, 2018; and also claims priority from Chinese Patent Application No. 201821186633.6 titled "A Light Strip and A Light-Emitting Components," filed Jul. 25, 2018, Chinese Patent Application No. 20181564179.3 titled "A Light Strip Circuit," filed Sep. 25, 2018; and also claims priority from Chinese Patent Application No. 202023325659.4 titled "A Light-Emitting Module," filed Dec. 31, 2020; and Chinese Patent Application No. 202121247615.6 titled "A Light-Emitting Module and Lighted Shoes," filed Jun. 4, 2021, the contents of which are incorporated in this disclosure by reference in their entirety.

BACKGROUND

The present invention relates to lighting and other electrical load technology, and more particularly to a light or other electrical load set circuit, a light strip and a control apparatus for driving the load set circuit. Common light strips typically include an array of light-emitting diodes (LEDs) soldered on wires or conductors of a flexible ribbon board. Such light strips can be inserted into a translucent or transparent tubular member, or directly molded into a device. When the light strip is connected to a power supply, it will emit light, which can look like a light band. It is known that the light color can be changeable and/or dimmable. The light color change can be controlled, with monochrome and RGB effects selected to provide colorful visual effects. Such light strips have been widely used in the decoration and lighting of buildings, bridges, roads, courtyards, furniture, automobiles, signs, etc., for decoration or lighting. The present invention also has application in controlling sets of other electrical loads such as heating elements and motion actuators, for example motors, solenoids, vibrators, and speakers.

In recent years, light strips are increasingly popular in applications such as wearable devices that are closely related to people's lives, and this role is not limited to decoration or lighting. For example, light strips can be placed on shoes, being activated on or off by closing and opening a switch, LED lights on a light strip can exhibit bright and dark flashing effects, increasing the beauty of the shoes while improving the safety of walking at night. Light strips can also be mounted at the front and/or rear of bicycles. Also, the bright and dark flashing effect acts as warning for improving the safety of night riding. Light strips can also be placed proximate protruding objects for prompting passersby to avoid such dangers.

However, in many applications the number of wires or other conductors and circuitry needed in the prior art for a desired effect becomes prohibitive in that each aspect of control typically requires a separate control line, plus a common (ground) return. For example, in the prior technology, a typical light strip control chip has two, three or four control terminals. Multiple light points are set between these terminals, and each light point includes one or more LED lights, which are turned on or off according to the control level of a corresponding control terminal. When the display of a specific mode is needed, the control signal for a particular aspect needs to be set specially, and LED lights of the light point generally cannot be individually turned on. Alternatively, the control chip can also be provided with enough control terminals so that each control terminal corresponds to one light of each light point. That way the control chip can control the lights of the light points individually, which can provide a greater variety of flashing modes, but the cost is markedly increased for larger numbers of light point lights.

Thus, there is a need for an improved circuitry and control apparatus that avoids the need for separate wires for each aspect of a light strip display.

SUMMARY

The present invention meets this need by providing a light-emitting electrical apparatus that directs light from plural LED light sources in particular directions for producing predetermined lighting effects, using a light set circuit that includes only a few control signal lines, at least three LED light sources that being variously directly connected between the control signal lines in such a way that each of the light sources can be individually turned on according to control levels of the control signal lines. As used herein, "connected between the control signal lines" means that opposite ends of each LED light source are electrically connected to respective ones of the control signal lines. More generally, the present invention provides light set circuits, each light set having a number of light elements that can be individually turned on using control signal lines numbering not more than the number of LED light sources in each light set circuit, and without an additional common (ground) line. In one aspect of the invention, a load set circuit includes three LED light sources, two of the light sources being polarized and connected in reverse polarity between two of the control signal lines, the other light source being connected between a third control signal line and one of the other control signal lines, at least three of the LED light sources being in a housing assembly having a casing and a back plate, the casing being adapted for directing light to exit in particular directions for producing predetermined lighting effects. Preferably a fourth LED light source is connected in reverse polarity with the other (third) LED light source. There can be a plurality of the light set circuits having equal complements of the LED light sources and corresponding connections to the control signal lines.

Preferably the electrical apparatus is combined with a control apparatus having control outputs is connected, respectively, to the control signal lines for selectively applying opposite signals of selected polarity between any two of the control signal lines, the remaining control signal line being in a floating state.

The control apparatus can include a connected memory, a control pulse generating circuit and a processor, the memory storing flashing mode control information of the LED light sources, the processor transferring the flashing mode control information via the control pulse generating circuit as pulse control signals to the set of LED light sources. The control apparatus can also include an I/O port, a trigger switch being connected to the I/O port for triggering the processor to transfer flashing mode control information from the memory to the control pulse generating circuit, initiating a flashing sequence of LED activations. The flashing sequence initiation can include transferring flashing mode control information of a different flashing mode from the memory to the control pulse generating circuit. The trigger switch can be a motion activated inertia switch, known as a flicker switch, which can be installed in association with the control apparatus in an article of clothing such as a wearer's shoe. At least one of the flashing modes can be a following flashing mode. Optionally, the flashing sequence can operate at rates above visual thresholds for apparently activating reverse polarity connected LED light sources simultaneously.

Preferably, the control apparatus is connected to the plurality of control signal lines for activating the LED light sources in a following sequence wherein at least some reverse-connected pairs of the LED light sources appear to be activated simultaneously, the activations being at a frequency above visual perception.

In another aspect of the present invention, the light-emitting electrical apparatus includes a set of at least four LED light sources and a plurality of control signal lines, first and second ones of the LED light sources being polarized and connected in reverse polarity with each other between two of the control signal lines, a third one of the LED light sources being polarized and connected between one of the first and second ones of the LED light sources and an additional control signal line of the plurality of control signal lines, whereby: one of the first and second LED light sources is independently selectively activated when opposite signals are applied between the first and second control signal lines with the third control signal line being kept in a floating state; the other of the first and second LED light sources is independently selectively activated when the signals are reversed with the additional control signal line remaining in the floating state; and the third LED light source is independently selectively activated when opposite signals are applied between the one of the two LED light sources and the additional control signal line, the other of the two control signal lines being kept in a floating state; the apparatus also including a housing assembly having a casing and a back plate, the first, second and third light sources being mounted on the back plate, the casing having a top wall and a luminous cavity formed between the back plate and the top wall, a side wall of the casing extending between the top wall and the back plate, at least 12 of the LED light sources being spaced and proximate the side wall; and means for directing light from ones of the LED light sources to exit the casing in particular directions for producing predetermined lighting effects, with the casing being formed of a transparent or translucent material, at least some light emitted from the LED light sources exiting the side wall of the casing, the casing further comprising an expansion ring extending outwardly from a lower portion of the side wall for receiving some of the light exiting from the side wall.

In a further aspect of the present invention, the light-emitting electrical apparatus includes: a set of at least four LED light sources and a plurality of control signal lines, first and second ones of the LED light sources being polarized and connected in reverse polarity with each other between two of the control signal lines, a third one of the LED light sources being polarized and connected between one of the first and second ones of the LED light sources and an additional control signal line of the plurality of control signal lines, whereby: one of the first and second LED light sources is independently selectively activated when opposite signals are applied between the first and second control signal lines with the third control signal line being kept in a floating state; the other of the first and second LED light sources is independently selectively activated when the signals are reversed with the additional control signal line remaining in the floating state; and the third LED light source is independently selectively activated when opposite signals are applied between the one of the two LED light sources and the additional control signal line, the other of the two control signal lines being kept in a floating state; the apparatus also including a housing assembly having a casing and a back plate, the first, second and third light sources being mounted on the back plate; and the casing having a slot formed therethrough for directing at least a portion of the light from at least one of the LED light sources to exit through the slot for directing light from ones of the LED light sources to exit the casing in particular directions for producing predetermined lighting effects, a pair of the LED light sources being spaced oppositely from the slot, the slot forming a pattern.

DRAWINGS

These and other features, aspects, and advantages of the present invention will become better understood with reference to the following description, appended claims, and accompanying drawings, where:

Figure 2:
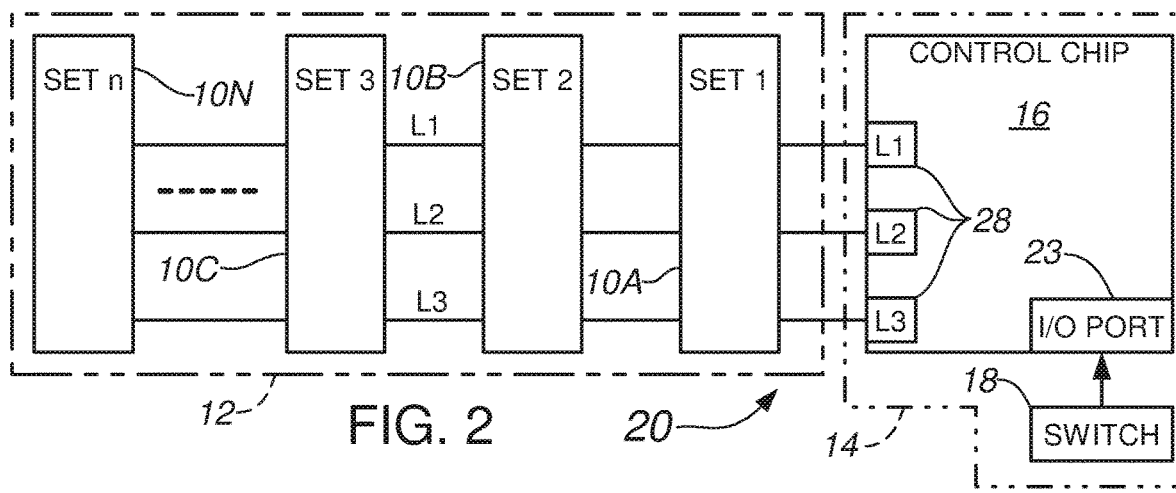
FIG. 2 is a block diagram of a light strip incorporating light set circuits of FIG. 1 in combination with a control apparatus in further accordance with the present invention.
Figure 7:
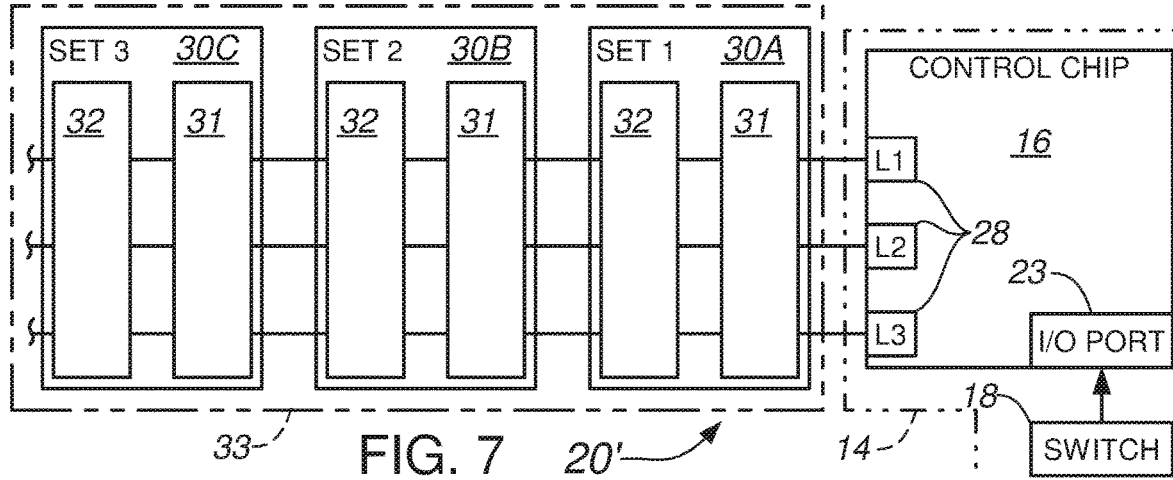
FIG. 7 is a block diagram as in FIG. 2, the combination incorporating the light set circuits of FIG. 6.
Figure 20:
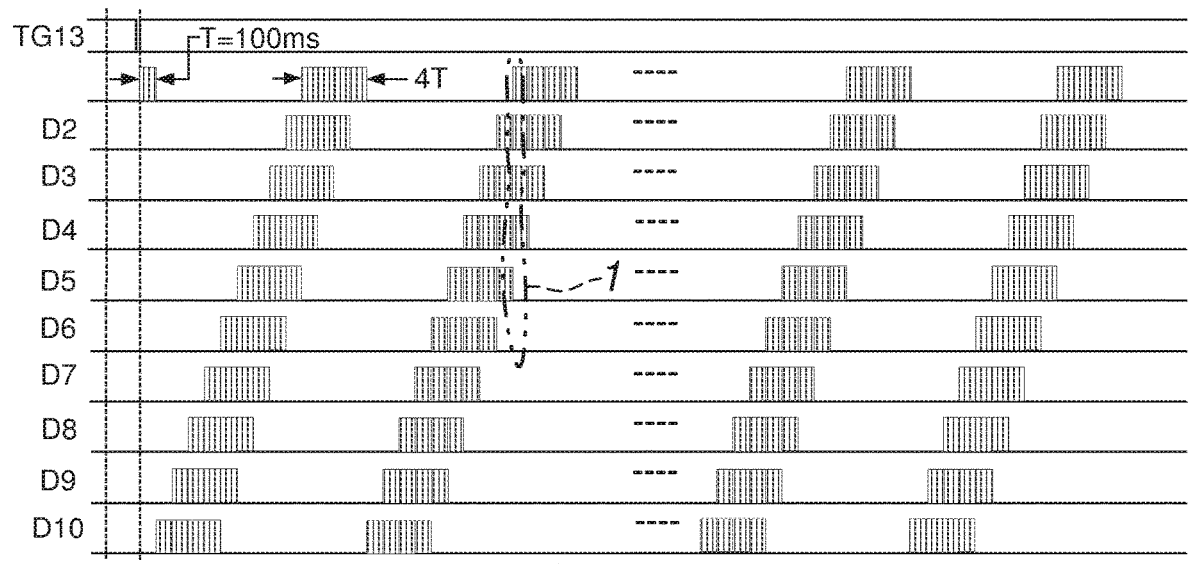
Figure 21:
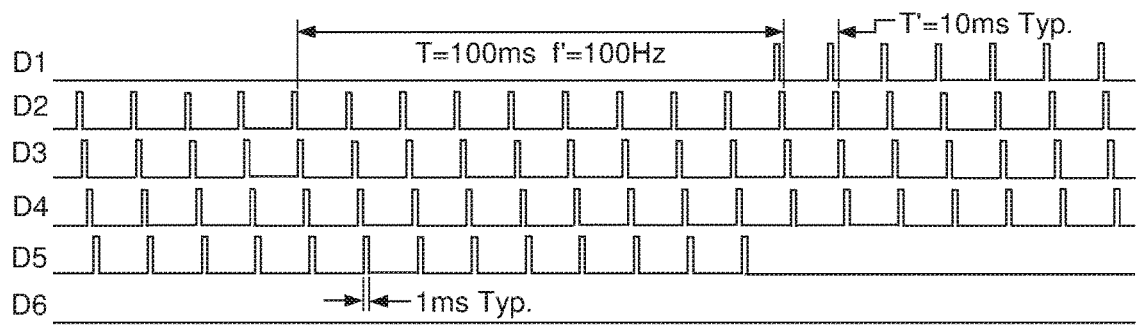
Figure 11:
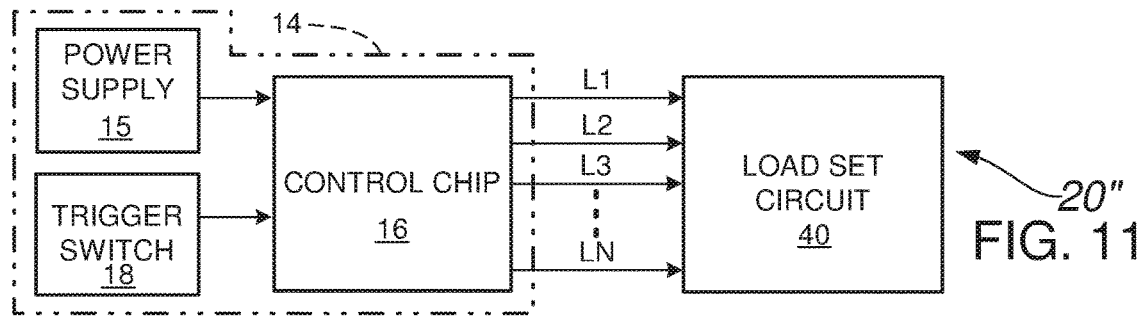
Figure 18:
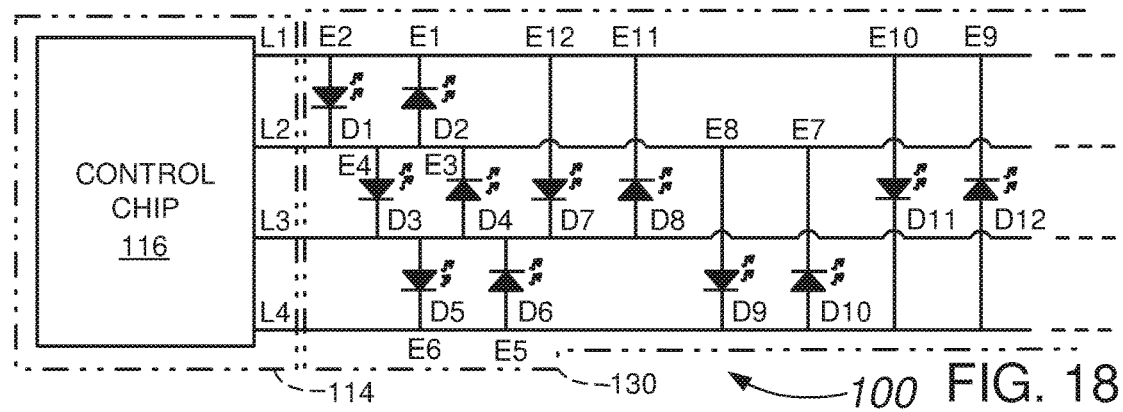
Figure 12:
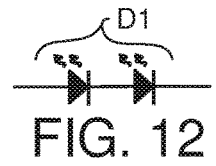
Figure 14:
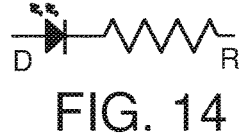
Figure 16:
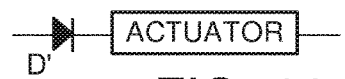
Figure 13:
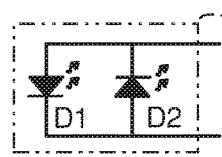
Figure 15:
Figure 17:
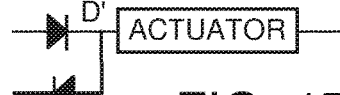
Figure 22:
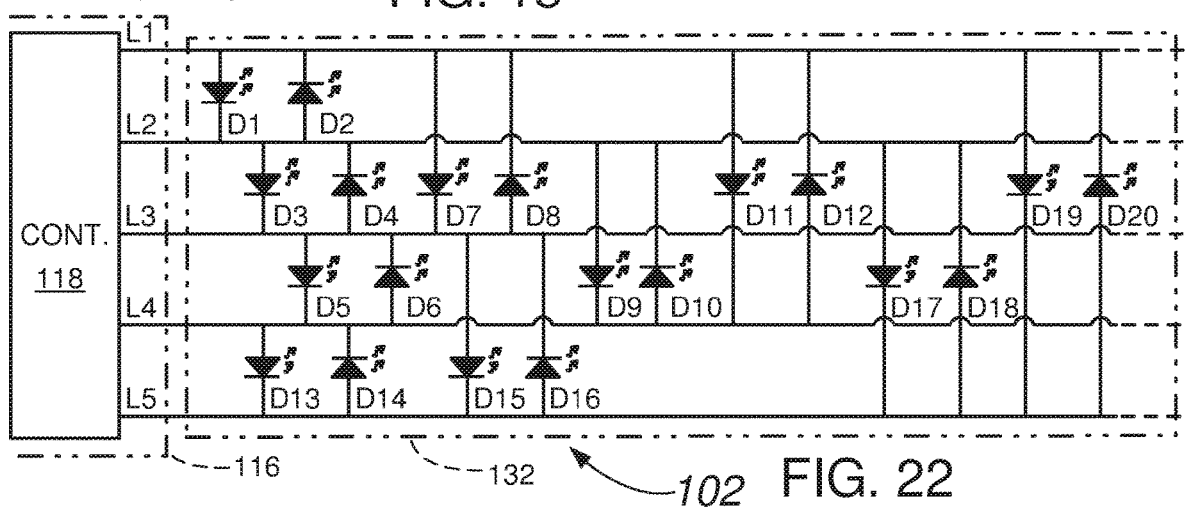
Figure 19:
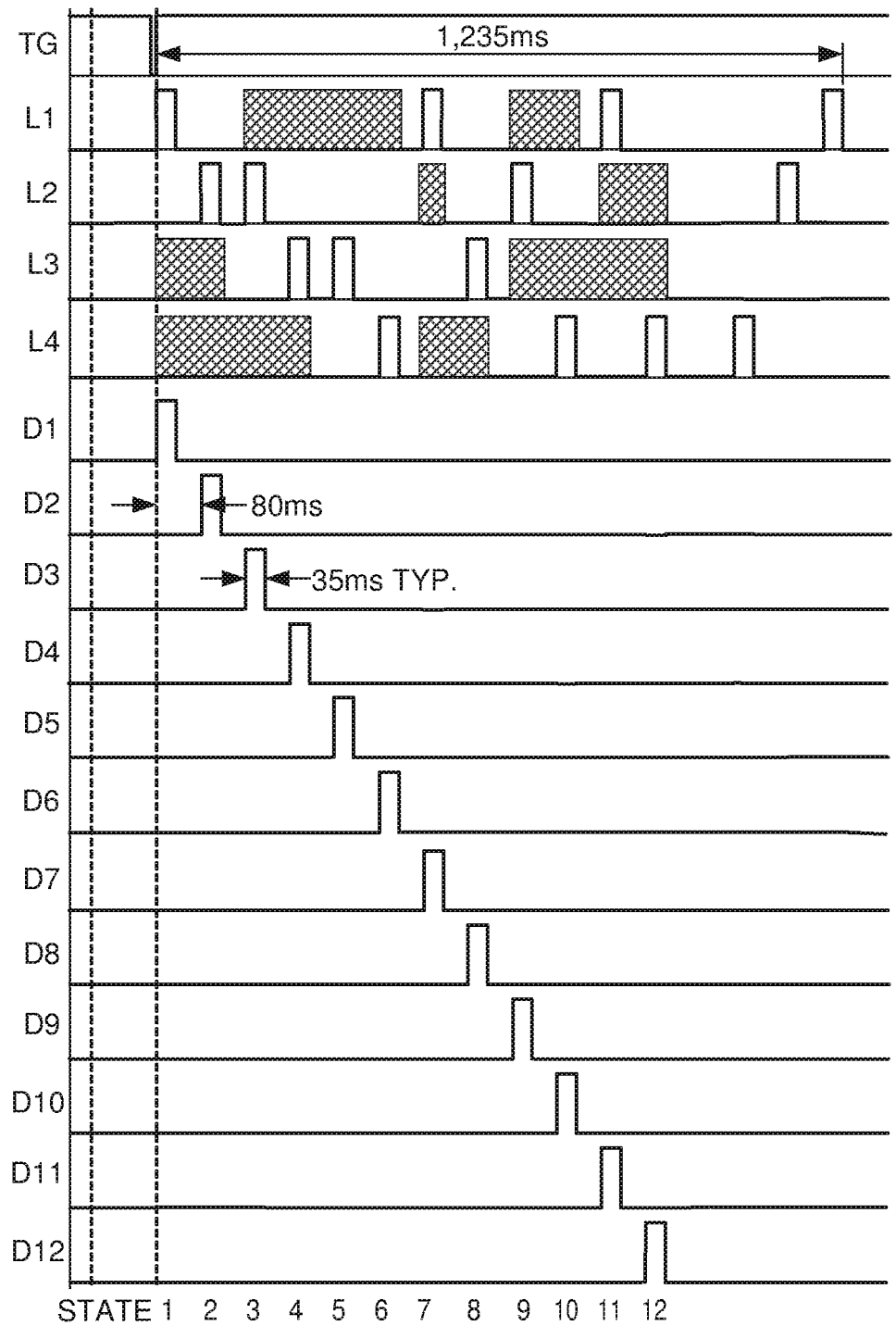
Figure 23:
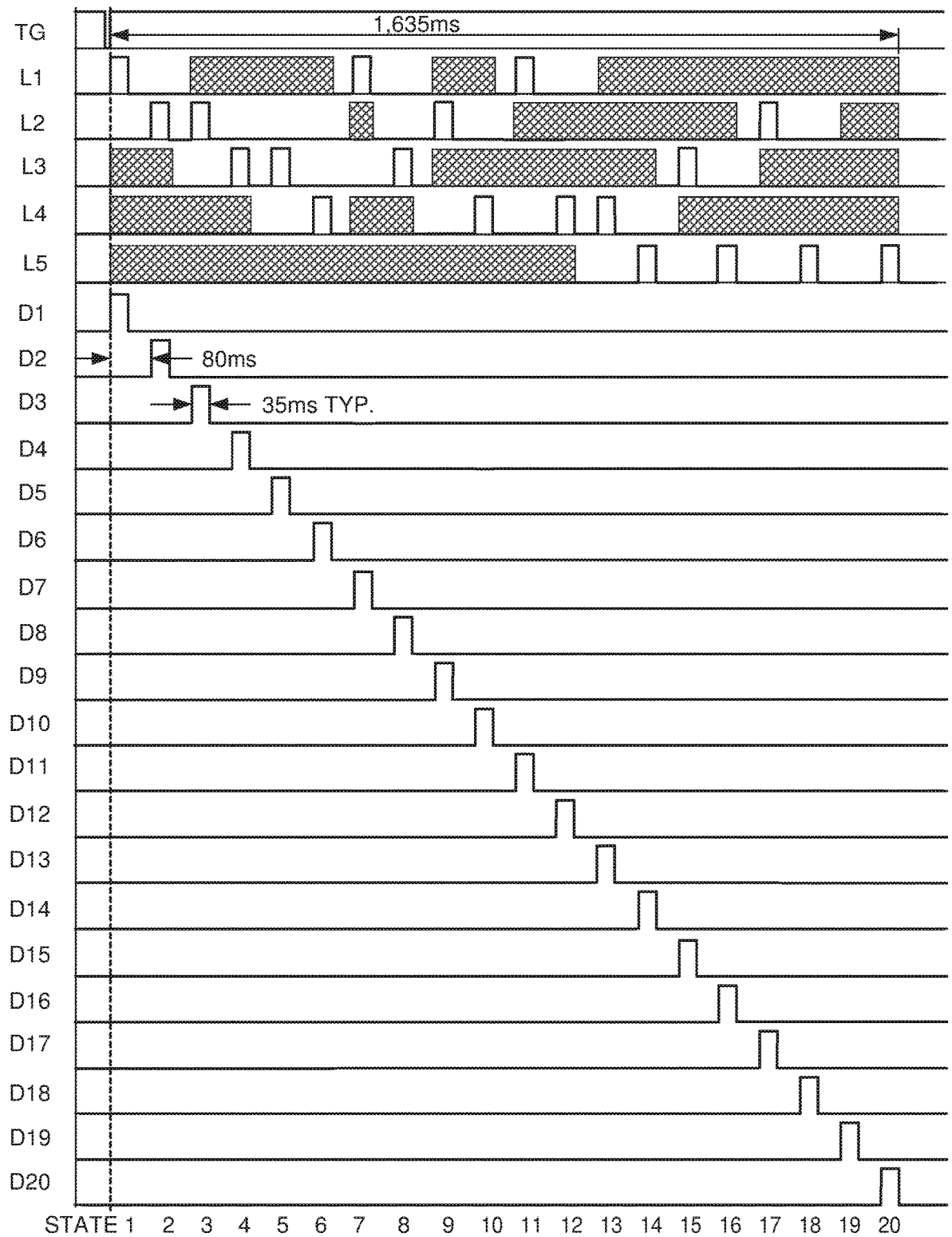
Figure 24:
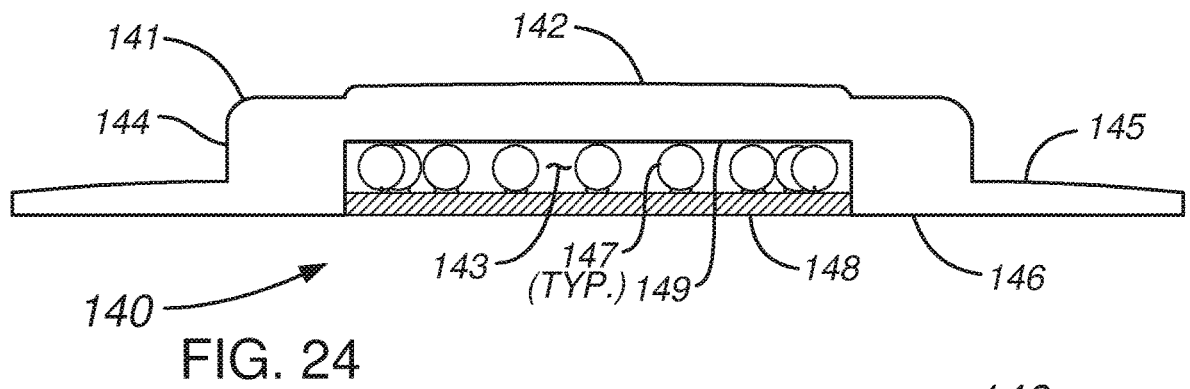
Figure 25:
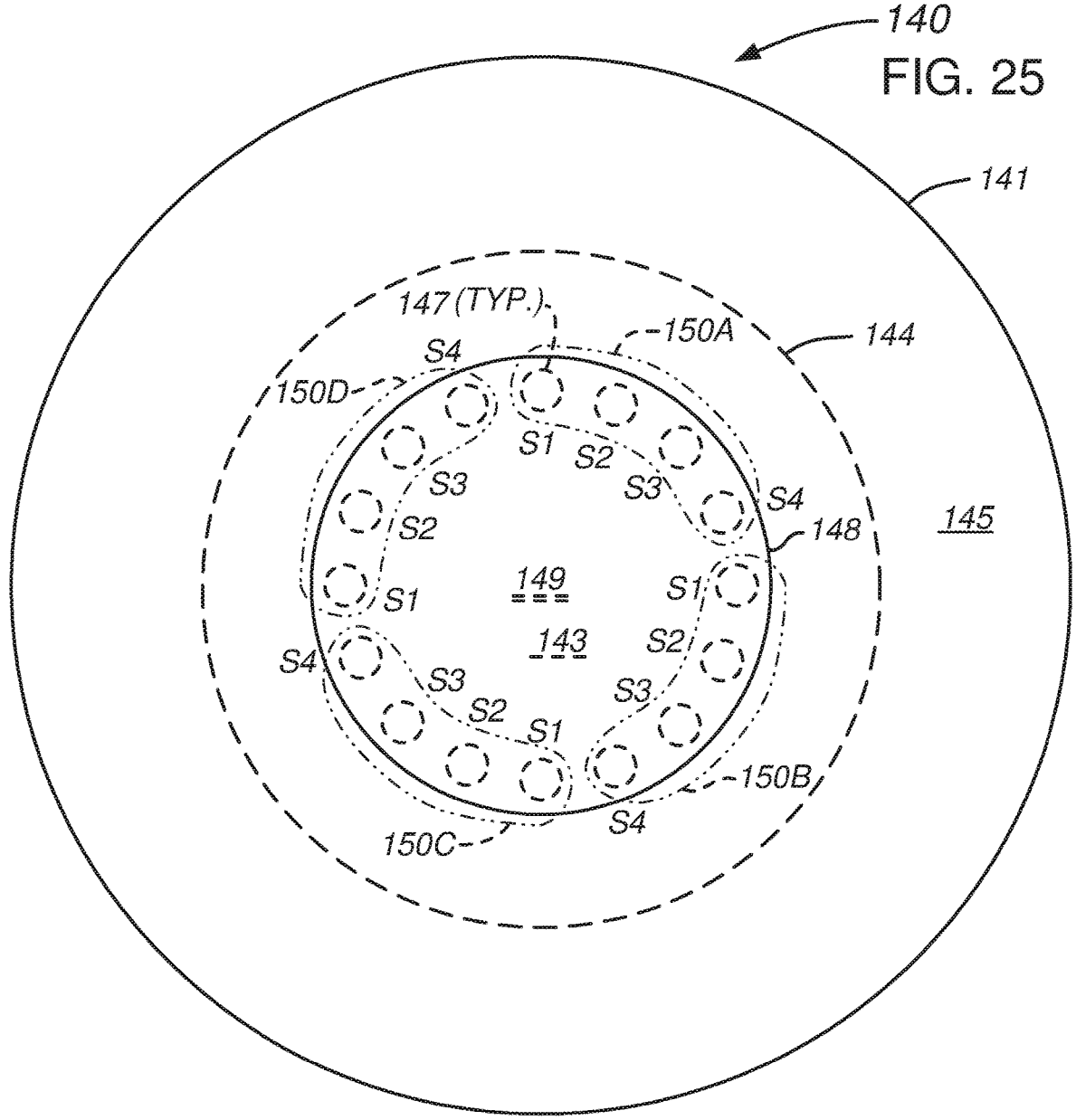
Figures 26, 27:
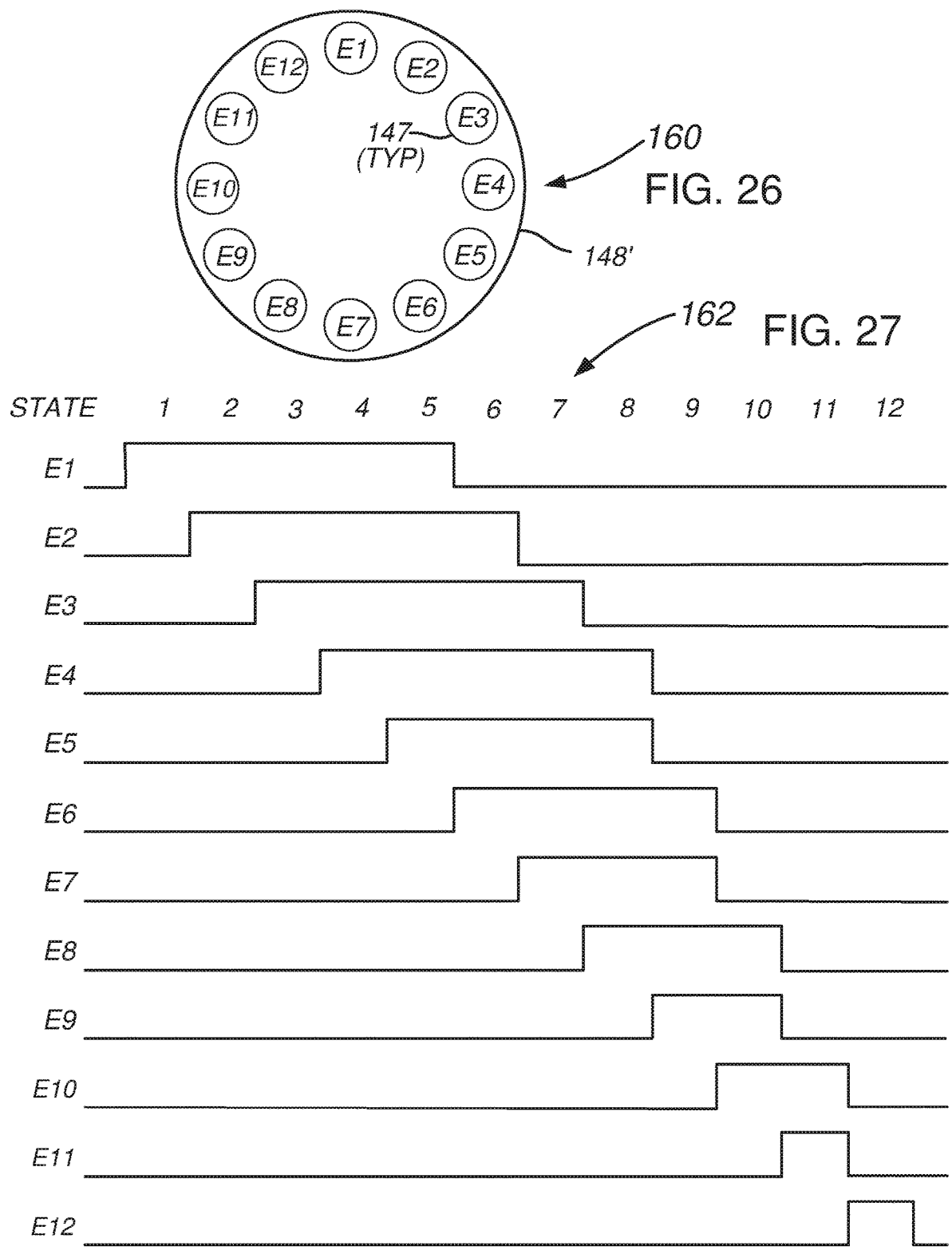
Figure 28:
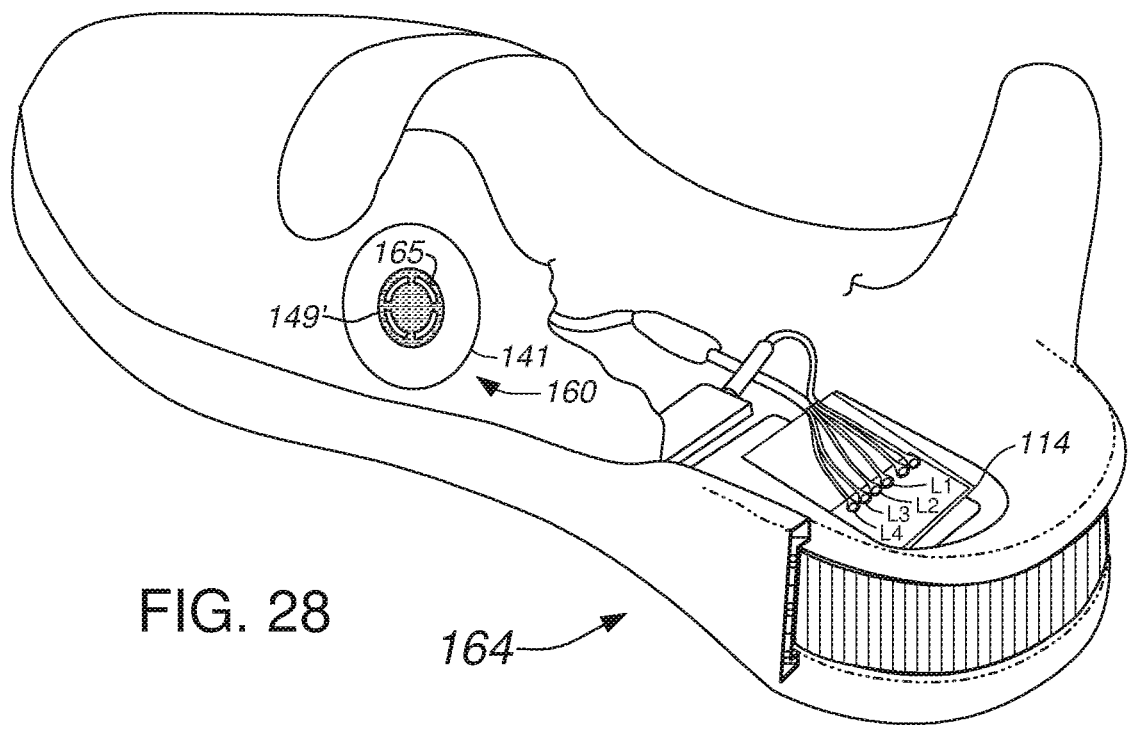
Figure 31:
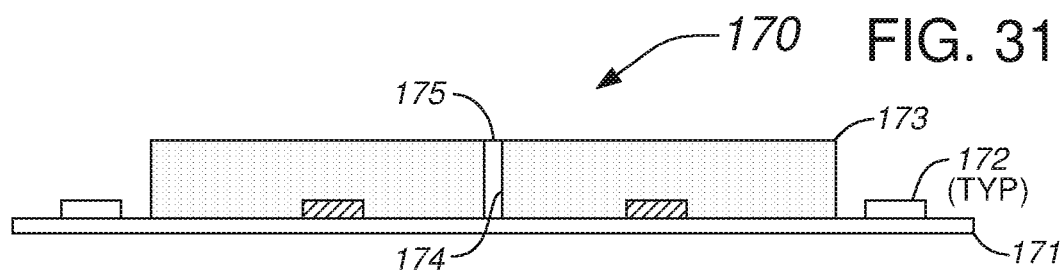
Figure 32:
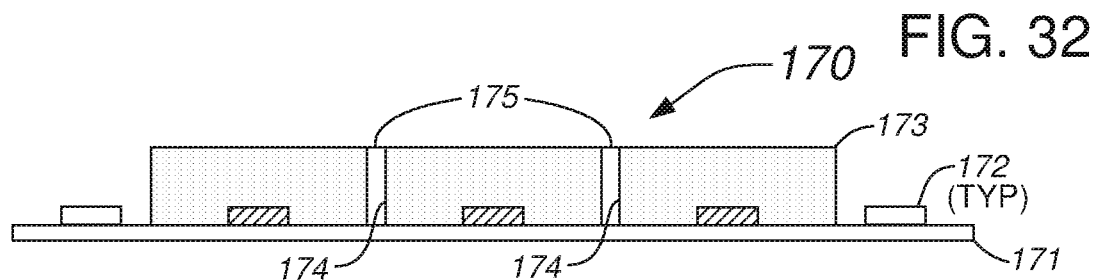
Figure 29:
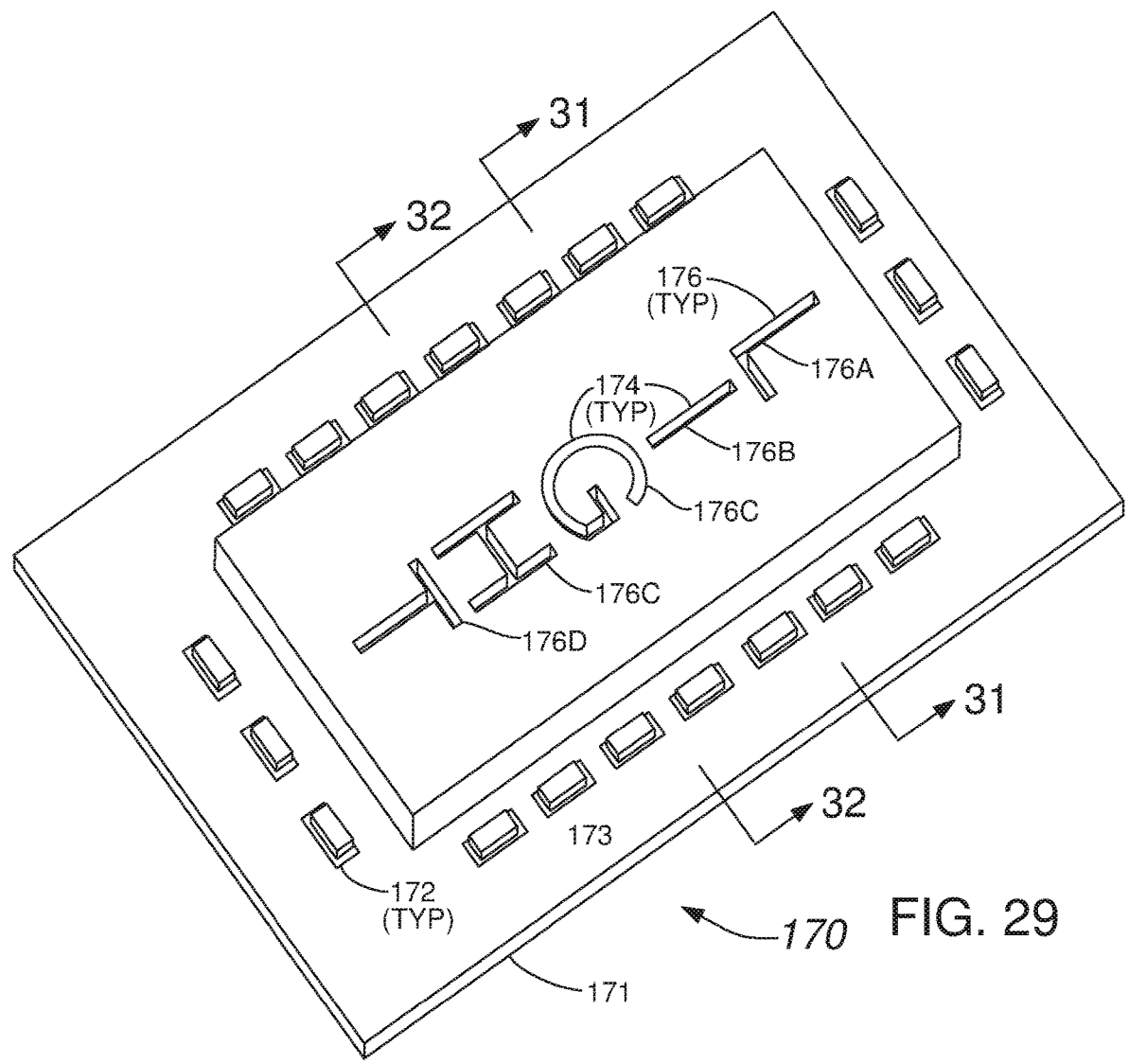
Figure 33:
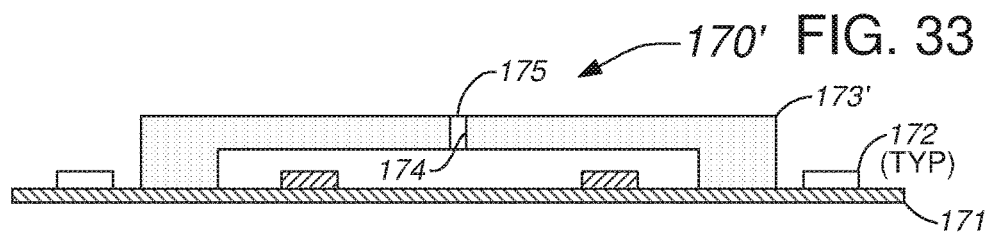
Figure 30:
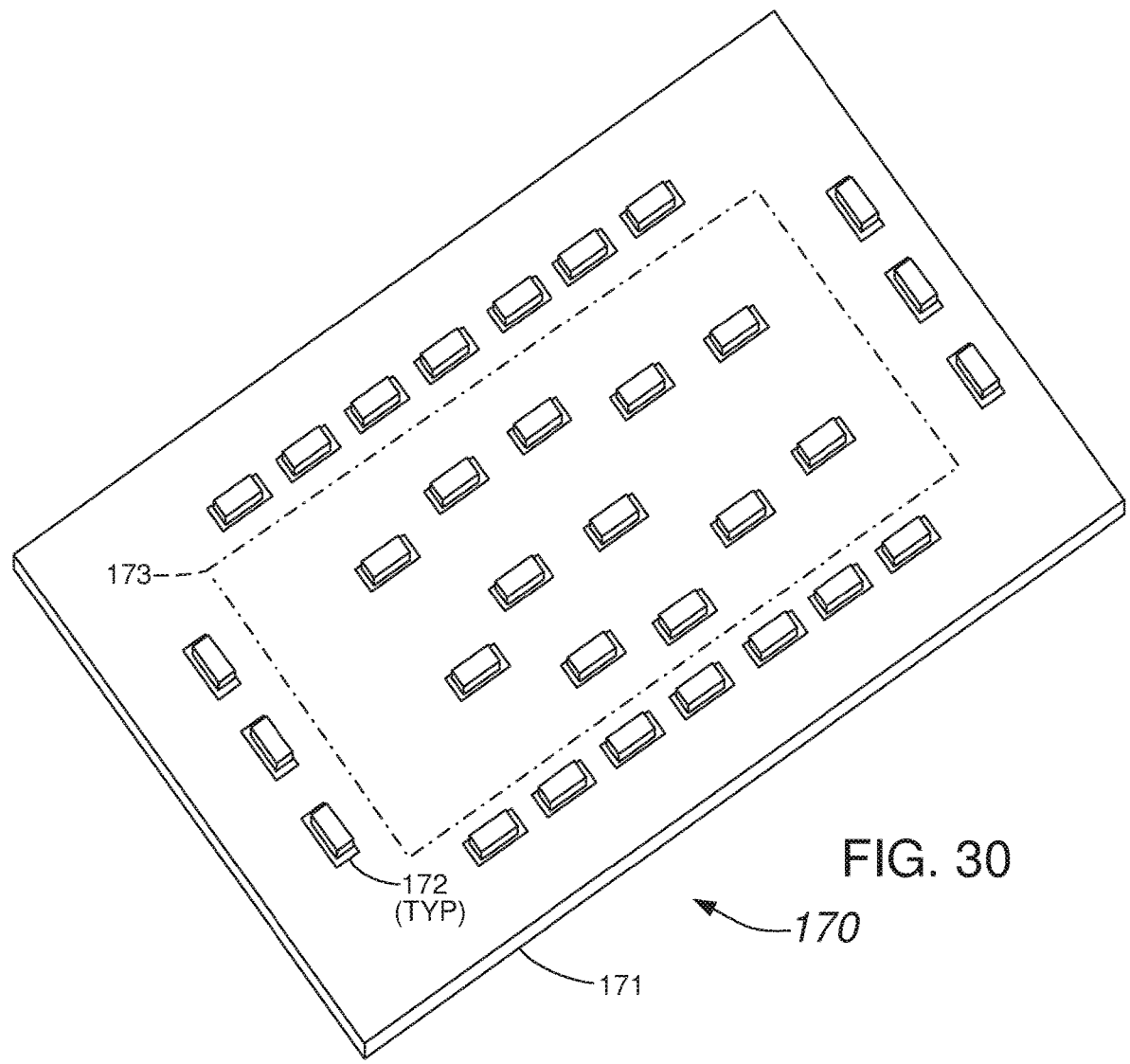
Figure 34:
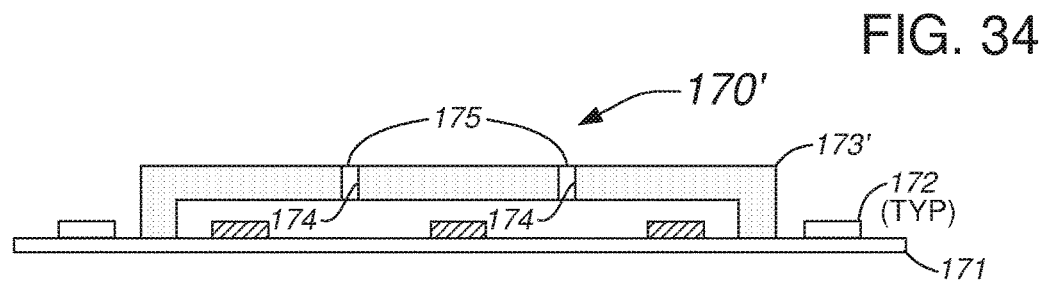

FIGS. 9A, 9B, 9C, 9D, 9E, 9F, and 9G are exemplary timing diagrams for operational sequences of the combination of FIG. 7;

FIGS. 10A, 10B, 10C, 10D, 10E, 10F, 10G, 10H, 10I, 10J, 10K, and 10L are further exemplary timing diagrams for operational sequences of the combination of FIG. 7;

FIG. 11 is a block diagram showing a general form of the present invention having the control apparatus of FIG. 2 in combination with an electrical load set circuit using N control signal lines only;

FIG. 12 is a schematic showing a conventional light-emitting diode (LED), consisting of a pair of light-emitting silicon diode elements connected in series and packaged in abutting relation;

FIG. 13 is a schematic depicting a conventional reverse-connected pair of LEDs forming a representative group of electrical loads;

FIG. 14 is a schematic of a series-connected LED and resistor forming an alternative electrical load configuration;

FIG. 15 is a schematic depicting an electrical load element in the form of a diode (which may not be light-emitting) series connected with a resistor;

FIG. 16 is a schematic depicting an electrical load element in the form of a diode series-connected with a motor;

FIG. 17 is a schematic showing a pair of diodes series-connected in opposite polarity to a motor and forming an alternative form of the electrical load group of FIG. 13;

FIG. 18 is schematic diagram showing the load strip combination of FIG. 11 having an alternative configuration of the light set circuit of FIG. 5, where N is 4;

FIG. 19 is an exemplary timing diagram for an operational sequence of the combination of FIG. 18;

FIG. 20 is an exemplary timing diagram for a cascading sequence of illuminations within a light strip incorporating the combination of FIG. 18;

FIG. 21 is an enlarged detail timing diagram showing a portion of the sequence of FIG. 22 within region 1 thereof;

FIG. 22 is a schematic diagram as in FIG. 18, showing another alternative configuration of the light set circuit, where N is 5;

FIG. 23 is an exemplary timing diagram for an operational sequence of the combination of FIG. 19;

FIG. 24 is a side sectional view of a light-emitting assembly according to an embodiment of the present invention;

FIG. 25 is a top view of the light-emitting assembly of FIG. 24;

FIG. 26 is a diagram showing an alternative configuration of a back plate portion of the light-emitting assembly of FIG. 24;

FIG. 27 is a timing diagram for an operational sequence of the light-emitting assembly of FIG. 24 having the alternative configuration of FIG. 26;

FIG. 28 is an oblique side perspective view of a shoe portion incorporating the light-emitting assembly of FIG. 24 having the alternative configuration of FIG. 26;

FIG. 29 is a perspective view of a light-emitting assembly according to another embodiment of the present invention;

FIG. 30 is a perspective view showing the light-emitting assembly of FIG. 29 with a light-transmitting body thereof removed therefrom;

FIG. 31 is an elevational cross-sectional view taken on line 31-31 in FIG. 29;

FIG. 32 is an elevational cross-sectional view taken on line 32-32 in FIG. 29;

FIG. 33 is an elevational cross-sectional view as in FIG. 31, showing an alternative configuration of the light-emitting assembly of FIG. 29; and FIG. 34 is an elevational cross-sectional view as in FIG. 32, showing an alternative configuration of the light-emitting assembly of FIG. 29.

Figure 3A:
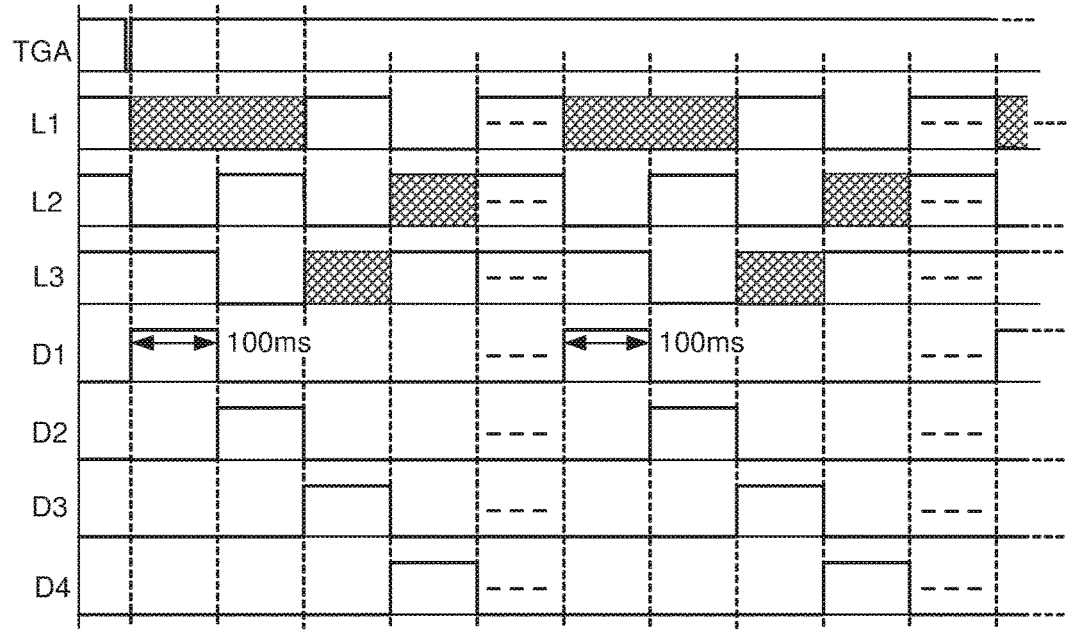
FIGS. 3A and 3B are exemplary timing diagrams of the combination of FIG. 2.
Figure 4:
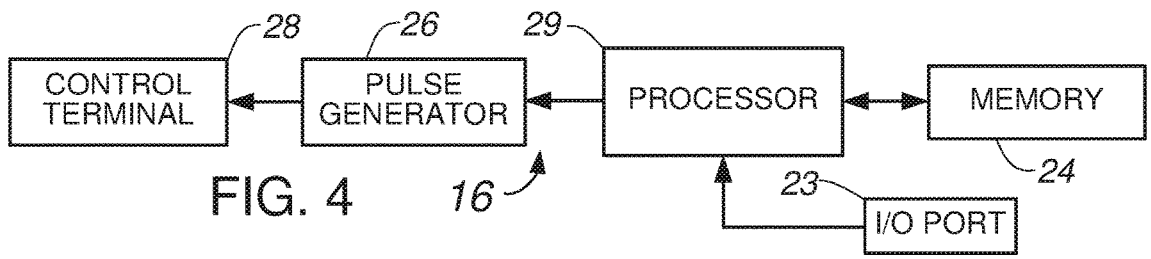
FIG. 4 is a schematic block diagram of the control apparatus of FIG. 2.
Figure 5A:
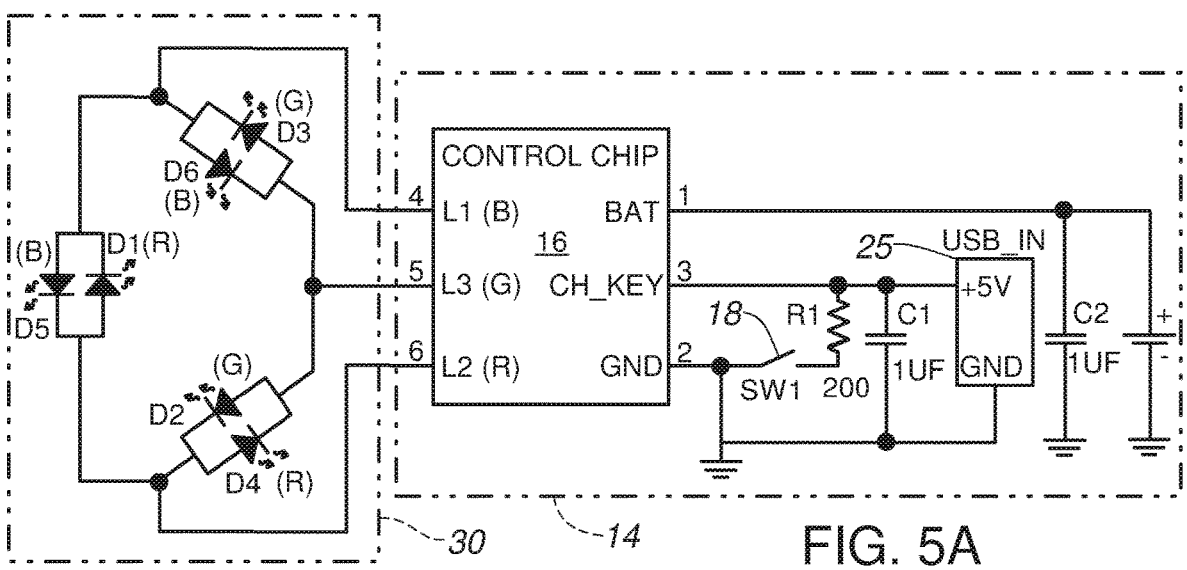
FIG. 5A is a circuit diagram showing an alternative configuration of the light set circuit of FIG. 1 and further detail of the control apparatus of FIG. 2.
Figure 8:
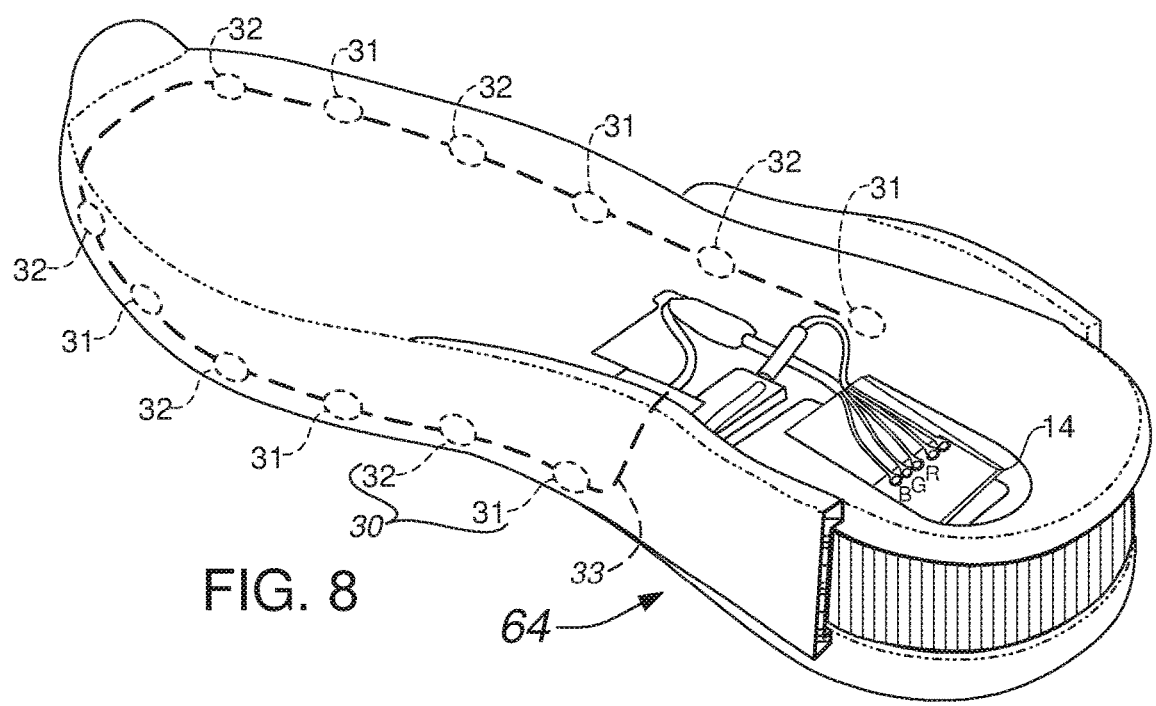
FIG. 8 is an oblique side perspective view of a lower shoe portion incorporating the light strip and control apparatus of FIG. 7.
Figure 3B:
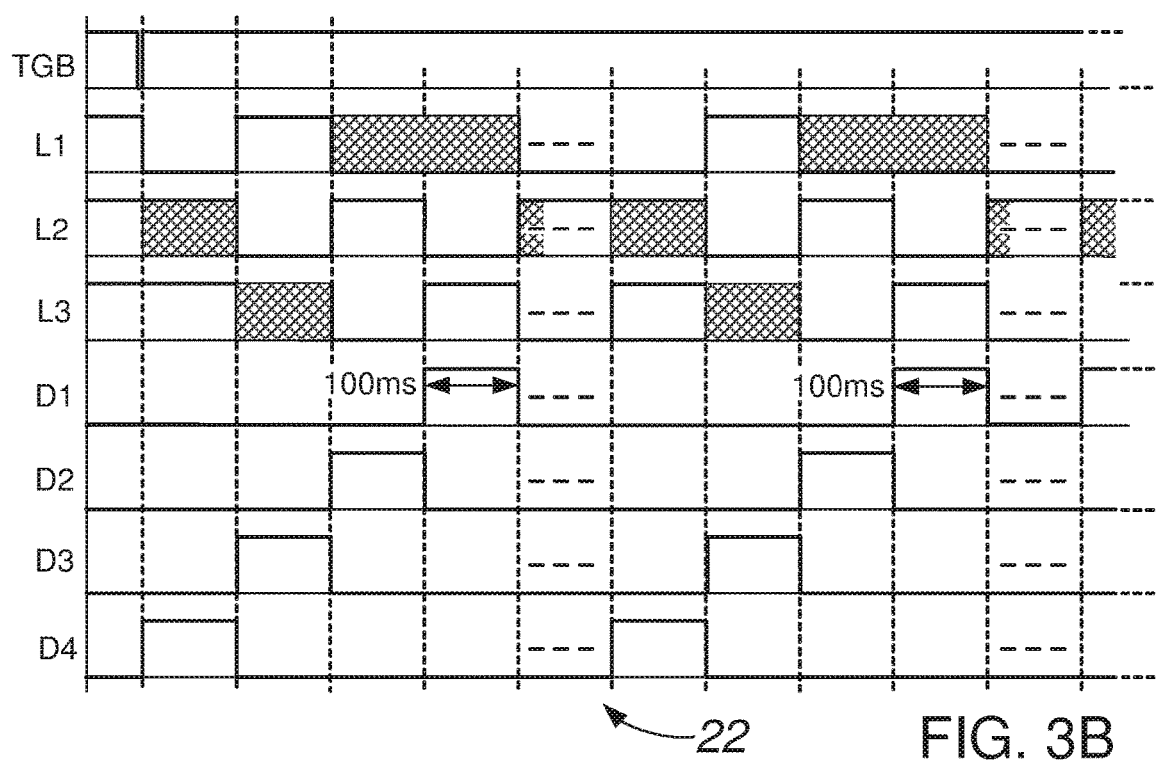
Figure 10K:
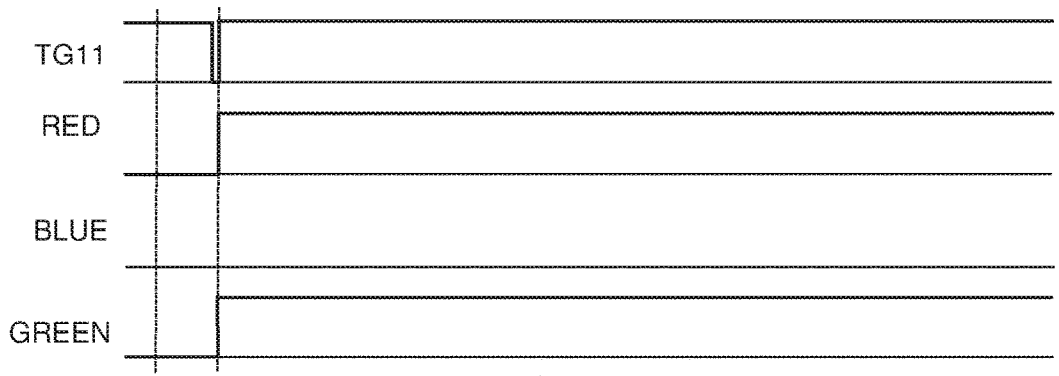
Figure 10L:
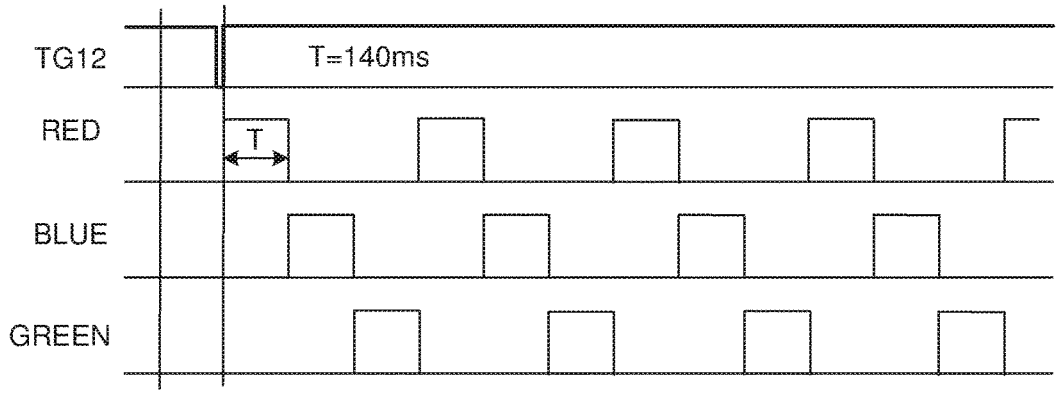
Figure 5B:
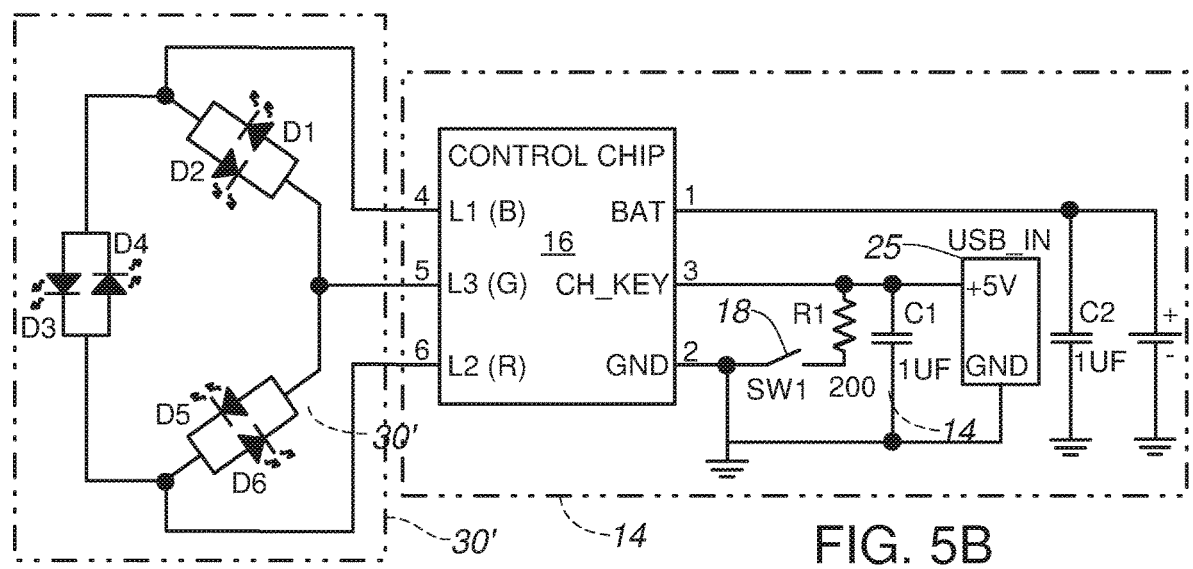
FIG. 5B is a circuit diagram as in FIG. 5, showing alternatively designated light sources of the included light set circuit.
Figure 5C:
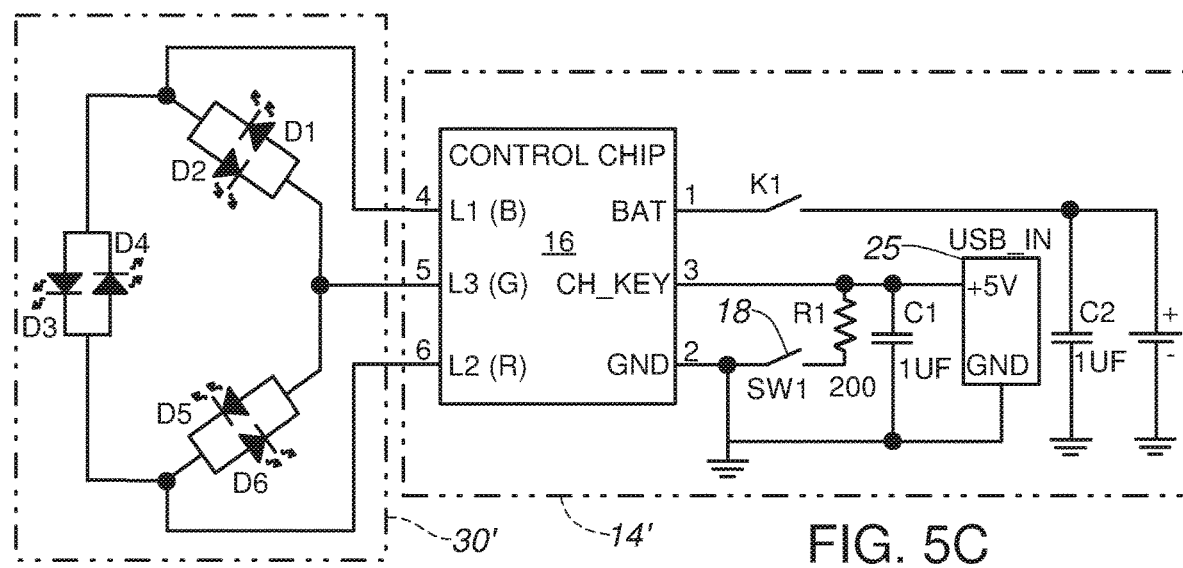
FIG. 5C is a circuit diagram as in FIG. 3A, showing an alternate configuration of control apparatus thereof.
Figure 9A:
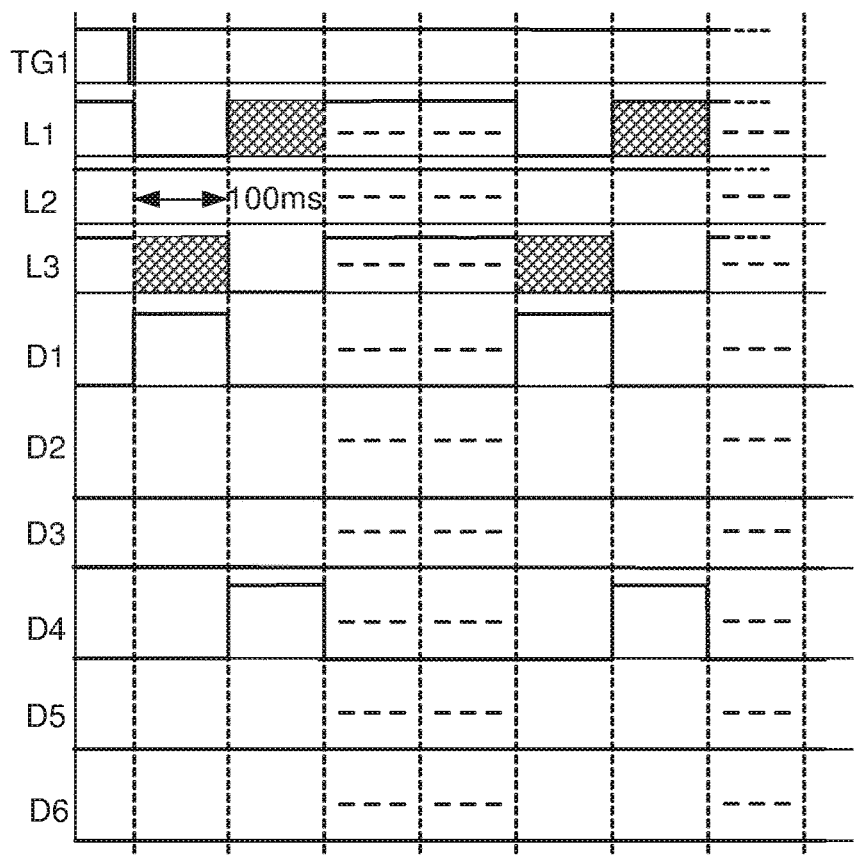
Figure 9B:
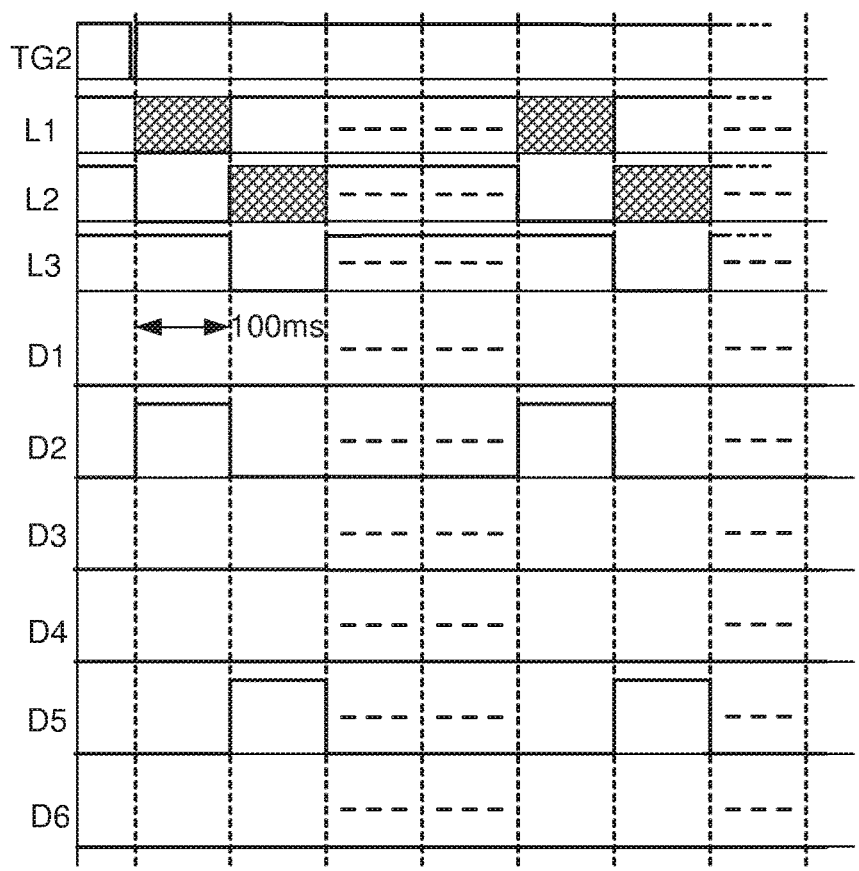
Figure 9C:
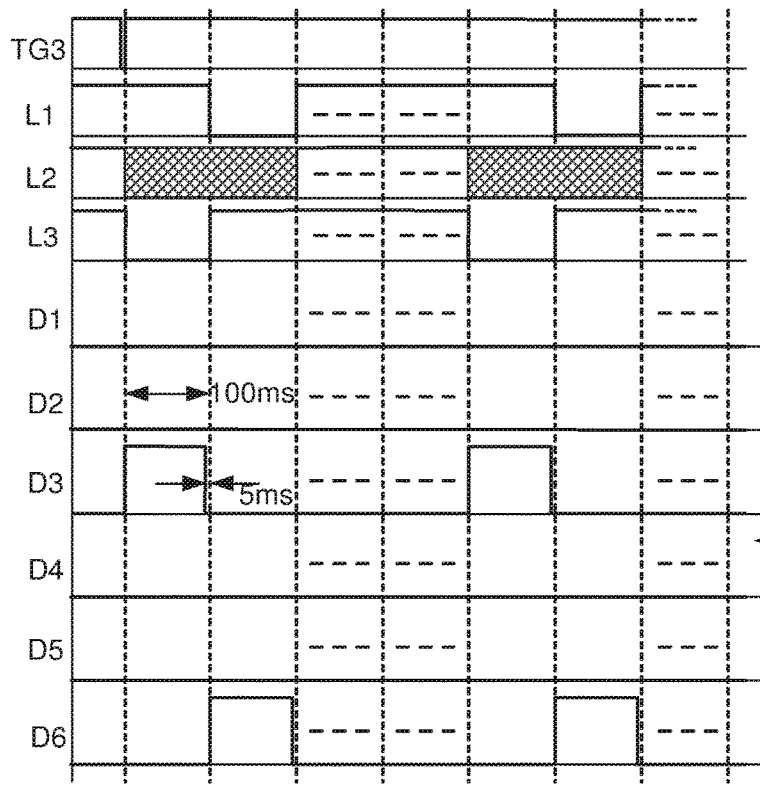
Figure 9D:
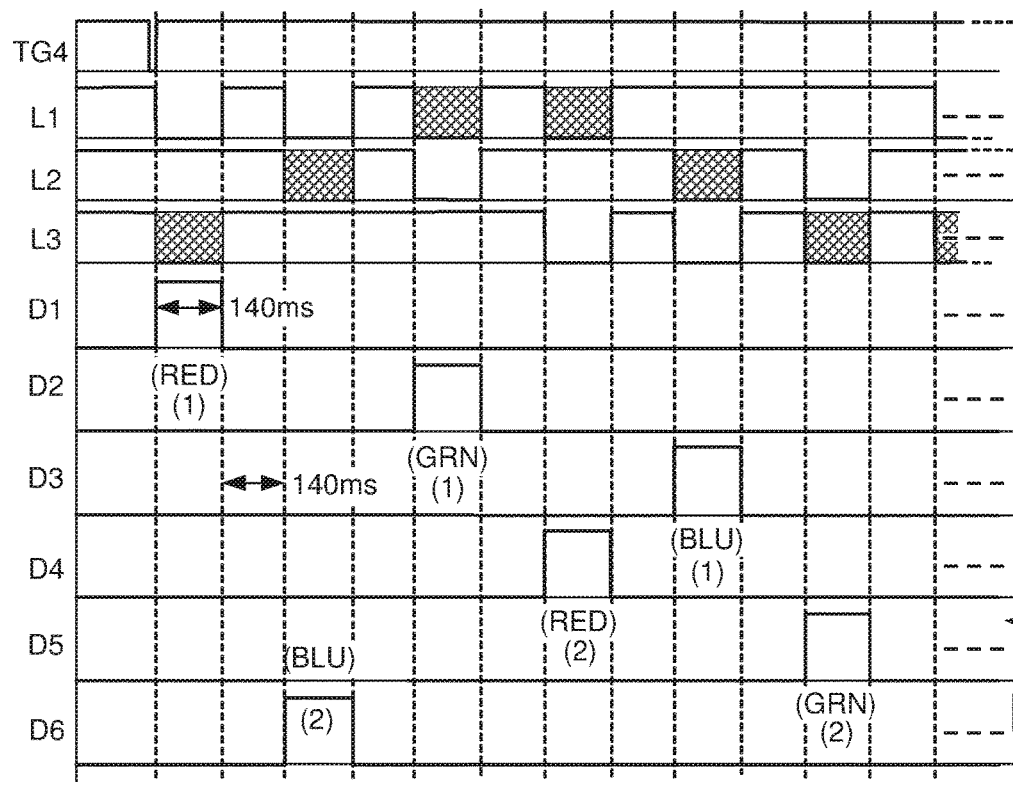
Figure 9E:
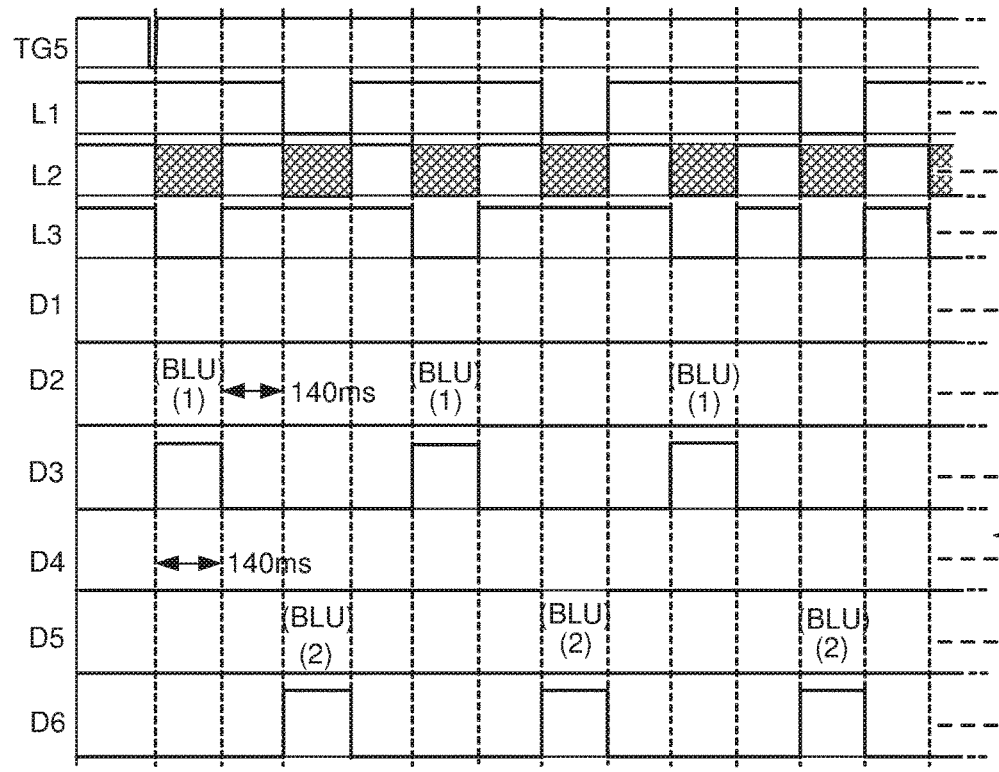
Figure 9F:
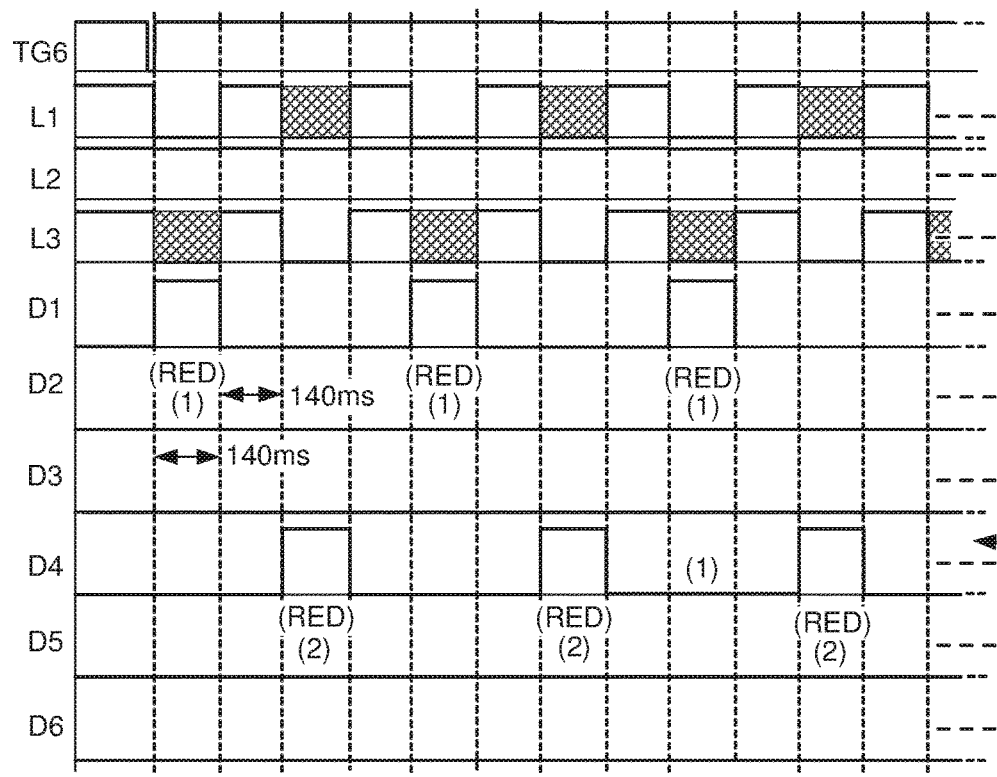
Figure 9G:
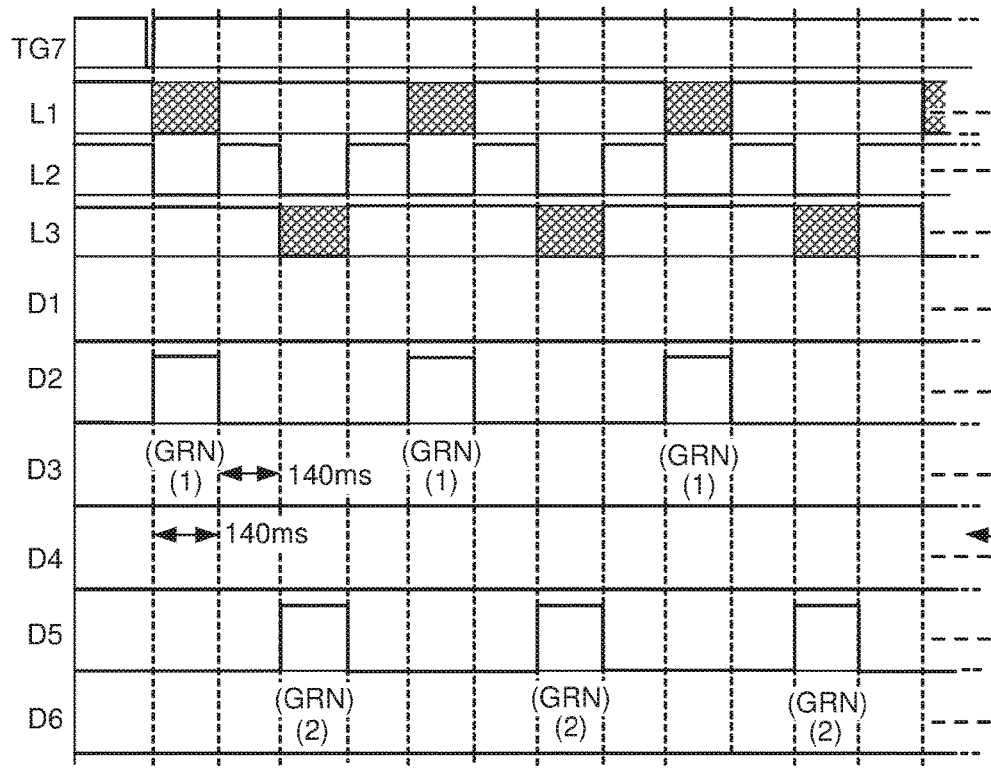
Figure 10C:
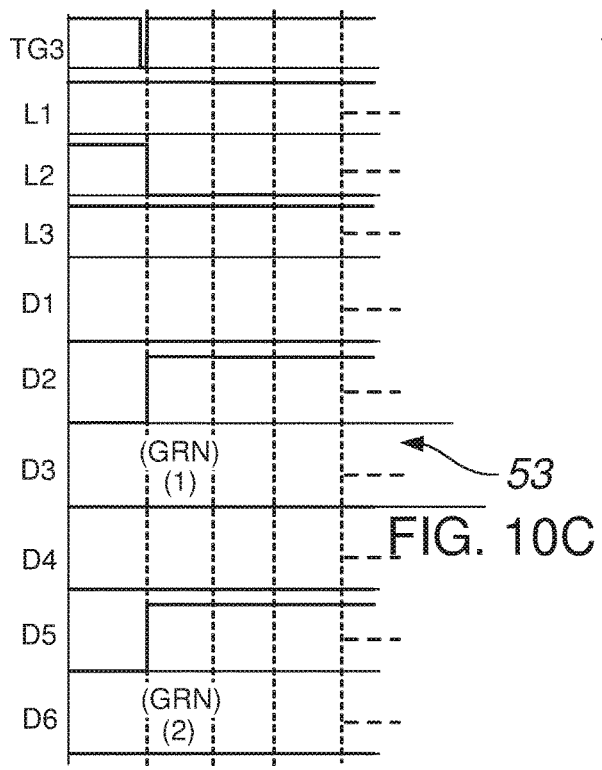
Figure 10D:
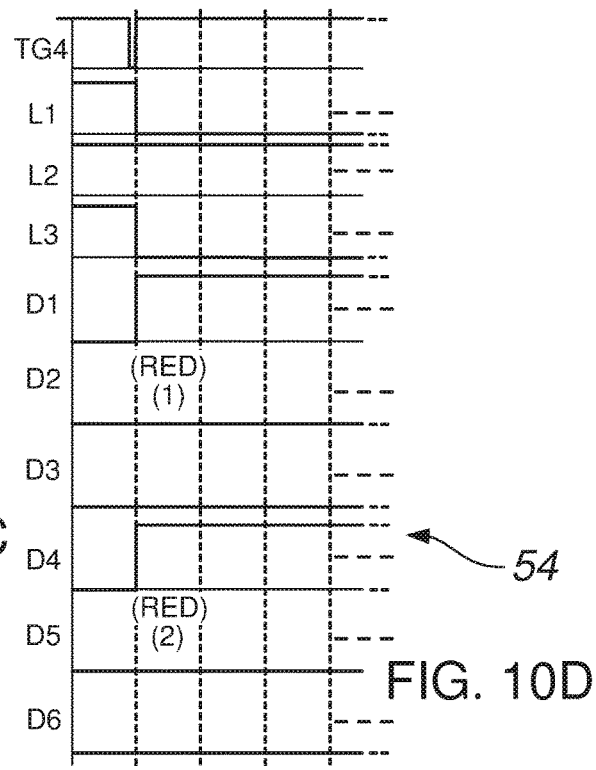
Figure 10A:
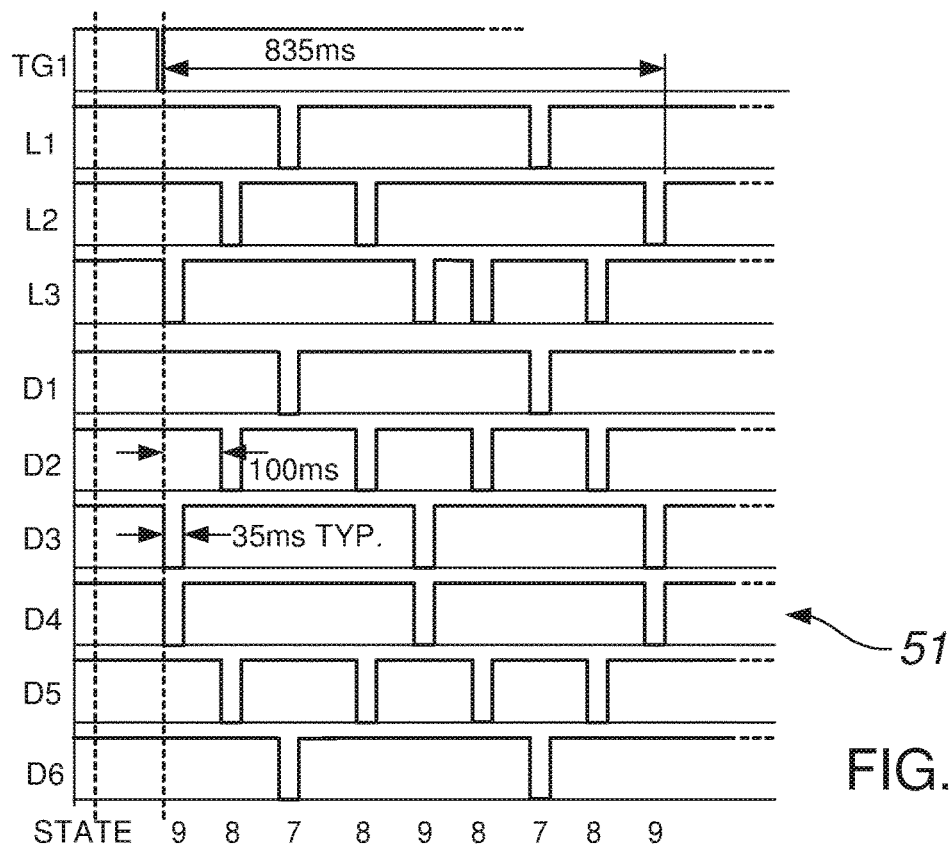

FIGS. 1, 2, 6 and 7 are on Sheet 1; FIG. 3A, FIG. 4 and FIG. 5A are on Sheet 2; FIGS. 9A and B are on Sheet 3; FIGS. 9C and 9D are on Sheet 4; FIGS. 9E and 9F are on Sheet 5; FIGS. 9G, 10C and 10D are on Sheet 6; FIGS. 10A and B are on Sheet 7; FIGS. 3B and 8 are on Sheet 8; FIGS. 10E-10G are on Sheet 9; FIGS. 10H-10J are on Sheet 10; FIGS. 10K, 10L, and 5B are on Sheet 11; FIGS. 11-18 and 22 are on Sheet 12; FIG. 19 is on Sheet 13; FIGS. 5C, 20 and 21 are on Sheet 14; FIG. 23 is on Sheet 15; FIGS. 24 and 25 are on Sheet 16; FIGS. 26 and 27 are on sheet 17; FIGS. 28, 31, and 32 are on sheet 18; FIGS. 29 and 33 are on sheet 19, and FIGS. 30 and 34 are on sheet 20 of the drawings.

DESCRIPTION

The present invention is directed to an electrical light set circuit that is particularly versatile yet inexpensive to produce, alone and in combination with suitable control apparatus. With reference to FIGS. 1, 2, 3A, 3B and 4 of the drawings, an exemplary light set circuit 10 includes four polarized light sources and three control signal lines, designated L1, L2, and L3, the light sources being connected in parallel pairs as described herein. Exemplary polarized light sources are LEDs, and four such LED light sources, designated D1, D2, D3, and D4, are connected to the three control signal lines. The LED light sources D1 and D2 are connected in reverse with each other between the second control signal line L2 and the third control signal line L3. The third LED light source is connected between the first control signal line and the second control signal line, and the fourth LED light source is connected between the first control signal line and the third control signal line, the connections of the third and fourth LED light sources to the first control signal line being in reverse polarity. More particularly, the positive terminal of the first LED light source D1 is connected with the third control signal line L3, and the negative terminal of the first LED light source D1 is connected to the second control signal line L2. The positive terminal of the second LED light source D2 is connected to the second control signal line L2, and the negative terminal of the second LED light source D2 is connected to the third control signal line L3. Similarly, the positive terminal of the third LED light source D3 is connected to the first control signal line L1, the negative terminal of the third LED light source D3 being connected to the second control signal line L2. Finally, the positive terminal of the fourth LED light source D4 is connected to the second control signal line L2 and the negative terminal of the fourth LED light source D4 is connected to the first control signal line L1.

The LED light sources D1-D4 are also designated S1-S4, respectively, being referenced that way in connection with FIG. 25, described below.

Plural counterparts of the light set circuit 10 are connected in parallel to the control signal lines L1, L2, and L3 to form a light strip 12 as indicated by dashed lines in FIG. 2, the individual light sets being designated 10A, 10B, 10C . . . 10N. The light strip 12 is connected to control apparatus 14 to form a light strip combination 20, the control apparatus 14 comprising a control chip 16 and a trigger switch 18 for activating the control chip 16. More particularly as shown in FIG. 4, the control chip 16 includes an I/O port 23, a memory 24, three pulse generating circuits 26 (one such being shown), three control terminals 28 (one such being shown), and a processor 29. It will be understood that there can be a single pulse generating circuit 26 having three channels for separately controlling the three control terminals 28. The control terminals 28 are connected, respectively, to the control signal lines L1, L2, and L3 as indicated in FIG. 2.

The trigger switch 18 is connected with the processor through the I/O port 23. The processor 29 responds to operation of the trigger switch 18 by producing a trigger signal TG for calling flashing mode control information corresponding to a predetermined flashing mode from the memory 24. Subsequent activations of the trigger switch 18 produce additional trigger signals TG that call from the memory 24 flashing mode control information that is typically different from a current flashing mode. Preferably the switch 22 is a flicker (momentary inertia) switch. Other forms of the switch 22, or more generally one or more input devices, such as keyboards, touch screens, and sensors responsive to environmental factors are within the scope of the present invention.

The processor 29 acquires flashing mode control information from the memory 24 and transfers the information to the respective control pulse generating circuits 26 (or independent channels of a single pulse generating circuit), and corresponding pulse control signals are generated for each of the control signal lines L1, L2, and L3 of the light strip 12. Thus, the light strip 12 can be controlled to flash in a particular pattern or mode.

In operation, control signal levels of opposite polarity are applied to two of the control signal lines, L2 and L3 for example, and the remaining control signal line L1 is kept in a floating state. Alternatively, control signal levels of opposite polarity are applied to the first and second control signal lines L1 and L2, and the third control signal line L3 is kept in a floating state. Thus, four active state combinations of the light set circuit 10 in which activation of a selected one only of the LEDs can be achieved according to the present invention as shown in Table 1 below, in which a high level is represented by a 1, a low level is represented by a 0, the floating state is represented by a dash (—), and a check mark (✓) represents the corresponding LED (D1, D2, D3, or D4) being on. Inactivation of all four of the LEDs is achieved in an inactive state 0 by any of several control signal line combinations, such as each of the control signal lines L1, L2, and L3 being at the same potential, the high level (1) for example.

TABLE 1

| State | Control signal line | | | LED light source | | | |
|---|---|---|---|---|---|---|---|
| | L1 | L2 | L3 | D1 | D2 | D3 | D4 |
| State 0 | 1 | 1 | 1 | | | | |
| State 1 | — | 0 | 1 | ✓ | | | |
| State 2 | — | 1 | 0 | | ✓ | | |
| State 3 | 1 | 0 | — | | | ✓ | |
| State 4 | 0 | — | 1 | | | | ✓ |
| State 5 | 1 | 0 | 1 | ✓ | | ✓ | |

Thus, as shown in Table 1, the light set circuit can turn on each LED light source D1-D4 separately by applying opposite control signal levels to two control signal lines L2 and either L1 or L3 of only three control signal lines L1, L2, and L3. Waveforms for an exemplary following flash sequence 21 for the light strip 12 are shown in FIG. 3A, wherein the control signal lines are driven sequentially and repetitively in the state combinations 1 through 4 of Table 1, as further described below. As used herein, a following, or flowing flash sequence is one in which successive light sources that are distributed lengthwise in a light strip are actuated sequentially for creating a one or more moving illumination regions. As described above, each light set circuit 10 includes four light points (D1, D2, D3, and D4), each corresponding to an LED light source; thus, there are 4n LED light sources or light points in the entire light strip 12, where n is the number of the light set circuits 10.

As further shown in Table 1, an additional state combination 5 provides simultaneous activation of the light points D1 and D3.

Figure 1:
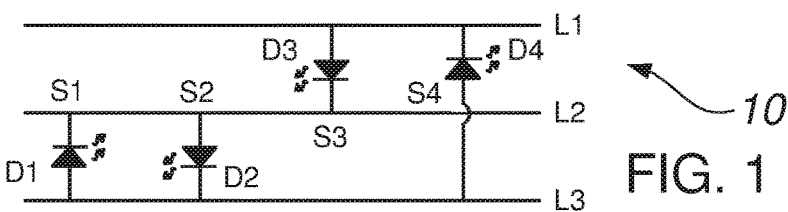
FIG. 1 is a circuit diagram of a light set circuit according to the present invention.

In a preferred example of the present invention, the plurality of light set circuits 10 of the light strip 12 have the same complement of LED light sources and the same connection structure of the control signal lines at the corresponding light sources. For example, in the light strip 12 of FIG. 2 using the light set circuits as shown in FIG. 1, the positive terminals of the first LED sources D1 are all connected with the third control signal line L3, and the negative terminals of the first LED sources D1 are all connected to the second control signal line L2. Similarly, the positive terminals of the second LED sources D2 are all connected to the second control signal line L2 and the negative terminals of the second LED sources D2 are all connected to the third control signal line L3. Likewise, the positive terminals of the third LED sources D3 are all connected with the first control signal line L1, the negative terminals of the third LED sources D3 are all connected with the second control signal line L2. Moreover, the positive terminals of the fourth LED sources D4 are all connected to the third control signal line L3 and the negative terminals of the fourth LED sources D4 are all connected with the first control signal line L1. In this way, the first LED light sources D1 of the plurality of light set circuits 10 have the same flashing/lighting operation. The other LED light sources D2, D3, D4 of the plurality of light set circuits 10 also have the same flashing/lighting operation of their own. By activation of the control signal lines L1, L2, and L3 sequentially in the states 1 through 4 in Table 1, the four LED light sources in each light set circuit 10 sequentially flash and cycle according to their placement along the light strip, as shown in FIG. 3A: D1→D2→D3→D4, this following or flowing flash sequence 21 being initiated by operation of the trigger switch 18 for producing a trigger pulse TGA as described above. This sequence is preferably repeated a predetermined number of times or indefinitely as indicated by dashed lines (- - -) in FIG. 3A. A subsequent trigger signal TGB preferably initiates a different flash sequence, such as a reverse flash sequence 22 that activates D4→D3→D2→D1→etc. as further shown in FIG. 3B. Thus, the entire light strip 12 can produce a visual effect similar to a following flashing display, the LED light sources flashing from one side to the other side of the light strip, in either or both directions.

Of course, those skilled in this field can understand that according to the above table, a variety of flashing modes or sequences can also be defined for the light strips, the following flashing display mode of FIGS. 3A and 3B described above being only exemplary, and these sequences can be arranged in any order in response to repeated activations of the trigger switch 18.

In the exemplary following flashing display mode control timing shown in FIGS. 3A and 3B, there are pulse intervals of 100 ms duration, with the LED light sources being activated sequentially in successive intervals, and repeated in subsequent intervals that are represented by dashed lines (- - -), the sequence being repeated a predetermined number of times, or until interrupted by another activating trigger signal TG.

With further reference to FIG. 5A, FIG. 5B, FIG. 5C, FIG. 6, and FIG. 7, an alternative configuration of the light set circuit, designated 30, includes the three control signal lines L1, L2, and L3, and an additional pair of LED light sources, designated D5 and D6, that are connected in reverse with each other between the first control signal line L1 and the third control signal line L3. FIG. 5 further shows the control apparatus 14 including a USB_IN socket 25 by which the battery of the apparatus can be charged through suitable conventional circuitry (not shown), the battery having a conventional filter capacitor C2. The USB_IN socket 25 also serves as an input port for setting activation durations and/or gaps between activations of LEDs and/or other electrical load elements. It will be understood that such input functions can be directly interfaced with the memory 24 as well. Suitable input devices can include a handwritten touch screen, a keypad, and a display device. The display device and the keyboard can be an integral structure or separate elements.

By setting the light-emitting duration of the light-emitting diode, the flashing frequency of the light strip can be controlled to create different visual perceptions and environmental atmospheres. For example, an LED can have a long light-emitting duration, and a slower flashing frequency, providing a softer visual experience, which is advantageous for decoration and aesthetics applications. When the LED has a short light-emitting duration and a faster flashing frequency, the visual experience is stronger, which is advantageous in warning situations.

The control chip 16 can include a sensor that senses environmental parameters of the environment where the light strip is located, and a power regulator that adjusts power output to the light-emitting diode according to environmental parameters. The control chip outputs different power levels to the LEDs through the power regulator to control the light-emitting intensity of the LEDs. The sensor can include a light sensor and a sound sensor, the environmental parameters thus including light and sound. The control chip 16 responds to higher light levels sensed by the light sensor by increasing the power output from the power regulator to the LED; conversely, lower light levels sensed by the light sensor produce reduced power output from the power regulator to the LED.

Also, or alternatively, the control chip 16 can include a sound sensor for sensing environmental sound levels and correspondingly adjusting LED brightness. In some situations, greater sound levels sensed by the sound sensor cause increased power output by the power regulator to the LED; reduced sound levels cause decreased power output by the power regulator to the LED. In other situations, smaller sound levels sensed by the sound sensor produce increased power output from the power regulator to the light-emitting diode is; increased sound levels sensed by the sound sensor produce decreased power output from the power regulator to the LED. Further, the USB_IN socket 25 can receive input for setting emitting light durations and/or timing intervals of the LED according to the environmental parameters sensed by the sensor.

FIG. 5B shows the combination of FIG. 5A having a counterpart of the light set circuit having different designations of the LED light sources D1-D6. FIG. 5C further shows the combination of FIG. 5B having a counterpart of the control apparatus, designated 14', with the addition of a power switch K1 between the rechargeable battery and the BAT terminal of the control chip 16. The power switch K1 prevents the trigger switch SW1 from being falsely triggered, causing the rechargeable DC power source to be consumed when the light strip is not being used. When the power switch K1 is in the open state, even if the trigger switch SW1 is triggered, the entire light-emitting component is in an open condition, and the light strip is thus prevented from entering an in-use condition, effectively preventing the power consumption problem caused by the trigger switch SW1 being falsely triggered.

Figure 6:
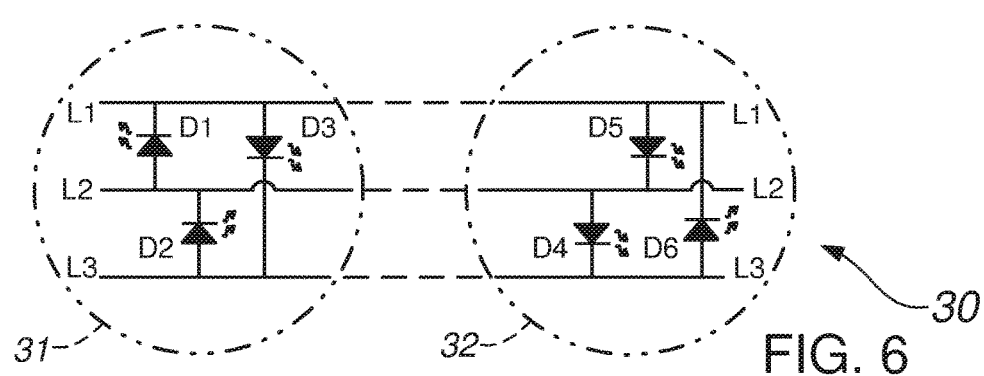
FIG. 6 is a circuit diagram showing an alternative configuration of the light set circuit of FIG. 5.

Preferably, the LED light sources are arranged separately in two light points (a first light point 31 and a second light point 32) that are connected between the three control signal lines as shown in FIG. 6. Pairs of the light points 31 and 32 form respective light set circuits, namely set 1 (30A), set 2 (30B), and set 3 (30C) being connected in sequence along the three control signal lines L1, L2, and L3 to form a counterpart of the light strip 12, designated 33, as shown in FIG. 7. Each of the light points 31 and 32 preferably includes three different color LED light sources.

Specifically, each light point includes three LED light sources, the first light point 31 including the light sources D1, D2 and D3. The positive terminal of the light source D1 is connected to the second control signal line L2, and the negative terminal of the light source D1 is connected to the first control signal line L1. The positive terminal of the light source D2 is connected to the third control signal line L3, and the negative terminal of the light source D2 is connected to the second control signal line L2. The positive terminal of the light source D3 is connected to the first control signal line L1, and the negative terminal of the light source D3 is connected to the third control signal line L3.

The second light point 32 includes the light source D4, the light source D5, and the light source D6. The positive terminal of the light source D4 is connected to the second control signal line L2, and the negative terminal of the light source D4 is connected to the third control signal line L3. The negative terminal of the light source D5 is connected to the second control signal line L2, and the positive terminal of the light source D5 is connected to the first control signal line L1. The negative terminal of the light source D6 is connected to the first control signal line L1, and the positive terminal of the light source D6 is connected to the third control signal line L3.

With further reference to FIG. 12, it will be understood that typical LEDs include a series-connected pair of light-emitting silicon diodes in a single compact package as indicated at D1 in FIG. 12, each silicon diode having a forward voltage of approximately 0.7V. Thus, D1 for example has a forward voltage of approximately 1.4V, being inactive and emitting no light (and passing no significant current) until close to 1.4V is applied. If increased application of forward voltage is applied there is a rapid increase in current and consequent increased brightness is produced. Thus, six LED light sources can be independently activated from the three control signal lines without use of an additional common connection. More particularly, if the control signal line L2 is driven high (1.4V), the control signal line L1 is held low (ground), and the control signal line L3 is kept in a floating state, D1 is activated but D4 and D6 are not activated in that they see only approximately 0.7V.

With further reference to FIG. 13, it is also known to package a reverse-connected pair of LEDs together, the LEDs D1 and D2 being of the same color or different colors and herein considered as a group G of polarized loads. Further, the term "group" is to be understood as applying whether or not D1 and D2 are packaged together or separately, and whether or not both D1 and D2 are present. With further reference to FIGS. 14-17, the term "polarized load" can also apply to an LED D connected in series with a resistive element R as shown in FIG. 14, the resistive element serving as a current limiter, a heater, and/or an interface to an external device. Also, the resistive element R can be series-connected to a non light-emitting diode D' as shown in FIG. 15. Other electrical load elements are also within the scope of the present invention as shown in FIG. 16 wherein the diode D (or LED) is series-connected with an actuator, which can be a DC motor, solenoid, etc. Thus, a combination of motors and other electrical loads can be individually controlled using fewer conductors than would otherwise be possible. It is even possible to provide bidirectional operation of a DC motor with the addition of another diode D of opposite polarity as shown in FIG. 17, each of the motor and the diodes D to be connected to different ones of the control signal lines L It will be understood that the arrangement of FIG. 17 requires that the control signal line voltages between the two diodes not reach the combined forward voltage rating of the diodes.

In the light set circuit 30 of FIG. 6, three LED light sources D1, D2, D3 of the first light point 31 are preferably different color LED light sources. Similarly, three LED light sources D4, D5, D6 of the second light point 32 are also different color LED light sources. Preferably, each light point includes a red LED light source, a green LED light source and a blue LED light source. The light source D1 and the light source D4 are preferably the same color, which can be red, the light source D2 and the light source D5 are also preferably the same color, which can be green, and the light source D3 and the light source D6 are of the same color, which can be yellow or blue.

As further shown in FIG. 7, the control signal lines L1, L2, and L3 are connected to the control chip 16 of a counterpart of the control apparatus 14, more particularly to corresponding terminals 28 as described above. In operation as described above, control signal levels of opposite polarity are applied to two control signal lines, and the remaining control signal line is kept in a floating state for individually activating selected ones of the six light points or sources D1-D6 in the configuration of FIGS. 5, 6, and 7.

With further reference to FIG. 8, the light strip combination 20 of FIG. 2 or the light strip combination 20' of FIG. 7 can be incorporated in a useful article, such as an article of clothing, one such article being a shoe lower portion 64 as shown in FIG. 8. The control apparatus 14 is located within the shoe lower portion 60 in a conventional manner, the light strip 33 extending proximate a perimeter portion within the shoe lower portion 60 that is sufficiently translucent to be seen when activated.

Exemplary flash sequences for this configuration are described below with further reference to FIGS. 9A-G. Particularly, each of the six LED light sources D1-D6 can be individually activated in corresponding states 1-6 according to Table 2 below, the symbols therein corresponding to those of Table 1 above, additional columns of Table 2 indicating exemplary colors and light points of activation. The column labeled Color-Point A reflects the light sources D1 and D4 being red, the light sources D2 and D5 being green, and the light sources D3 and D6 being blue. The column labeled Color-Point B reflecting the light sources D5 and D6 being changed to blue and green, respectively. It will be further understood that the polarities of the light sources D2 and D4 can be reversed from that shown in FIG. 6, being activated when the signal control lines L1, L2, and L3 are driven, respectively in state 3 (−0 1) and state 2 (−0 1).

As shown in Table 2, the light set circuit 30 can turn on each LED light source D1-D3 of the first light point 31 and each LED light source D4-D6 of the second light point 32 separately by applying the control level to two control signal lines of only three control signal lines L1-L3, the remaining control line being kept on a floating state.

TABLE 2

| State | Control signal line | | | First light point | | | Second light point | | | Color-Point A | Color-Point B |
|---|---|---|---|---|---|---|---|---|---|---|---|
| | L1 | L2 | L3 | D1 | D2 | D3 | D4 | D5 | D6 | | |
| State 0 | 1 | 1 | 1 | | | | | | | | |
| State 1 | 0 | 1 | — | ✓ | | | | | | Red-1 | Red-1 |
| State 2 | — | 1 | 0 | | | | ✓ | | | Red-2 | Red-2 |
| State 3 | — | 0 | 1 | | ✓ | | | | | Grn-1 | Grn-1 |
| State 4 | 1 | 0 | — | | | | | ✓ | | Grn-2 | Blu-2 |
| State 5 | 1 | — | 0 | | | ✓ | | | | Blu-1 | Blu-1 |
| State 6 | 0 | — | 1 | | | | | | ✓ | Blu-2 | Grn-2 |

Similarly to the above-described exemplary configuration of FIGS. 1-4, the light set circuits 30, individually designated 30A (Set 1), 30B (Set 2), and 30C (Set 3), form a counterpart of the light strip 12, designated 33, as shown in the dashed box in FIG. 7. It will be understood that additional light set circuits 30 can be connected to the same control signal lines L1, L2, and L3 of the light strip 32. Each light set circuit 30 includes the two light points 31 and 32. Thus there are 2n light points in the entire light strip 33, where n is the number of the light set circuits 30 and is greater than 1, and each light point including three LED light sources, a total of 6n light sources.

Preferably, the plurality of light set circuits 30 have identical counterparts of the three LED light sources in respective ones of the light points 31 and 32, and the same connection structure to the control signal lines at the corresponding light points. For example, in the light set circuits 30 as shown in FIG. 6, the first light point 31 includes the light source D1, the light source D2 and the light source D3. The positive terminal of the first LED light source D1 is connected to the second control signal line L2, and the negative terminal of the first LED light source D1 is connected to the first control signal line L1. The positive terminal of the light source D2 is connected to the third control signal line L3, and the negative terminal of the D2 light source is connected to the second control signal line L2. The positive terminal of the light source D3 is connected to the first control signal line L1, and the negative terminal of the light source D3 is connected to the third control signal line L3. The second light point 32 includes the light source D4, the light source D5, and the light source D6. The negative terminal of the light source D4 is connected to the third control signal line L3, and the positive terminal of the light source D4 is connected to the second control signal line L2. The negative terminal of the light source D5 is connected to the second control signal line L2, and the positive terminal of the light source D5 is connected to the first control signal line L1. The negative terminal of the light source D6 is connected to the first control signal line L1, and the positive terminal of the light source D6 is connected to the third control signal line L3. Thus, the first and second light points of the plurality of light set circuits have the same flashing or lighting mode.

According to the control state sequence in the Table 2 above, light sources of the first light point and the same color ones of the second light point can be controlled to flash alternately on the light strip 32. For example, when the light color of the light source D1 is the same as that of the light source D4, the light color of the light source D2 is the same as that of the light source D5, and the light color of the light source D3 is the same as that of the light source D6 according to the Color-Point A column of Table 2, the LED light sources can flash and cycle alternately in the same color by a first flash sequence 41 of D1→D4 as shown in FIG. 9A, by a second flash sequence 42 of D2→D5 as shown in FIG. 9B, or by a third flash sequence 43 of D3→D6 as shown in FIG. 9C. When the colors of the light sources D5 and D6 are reversed as described above according to the Color-Point B column of Table 2, the same result for the flash sequence 43 is obtained by reversing activation of the signal control lines L1, L2, and L3 between the State 4 (1 0–) and the state 6 (0 – 1). Thus, the entire light strip can produce a visual effect similar to the flowing or following flashing, and the LED light sources flash from one side to the other side of the light strip 32.

FIG. 9D further shows a fourth flash sequence 44 wherein, at intervals of 140 ms, the light sources D1, D6, D2, D4, D3, and D5 are activated in sequence, separated by inactive intervals that are also of 140 ms duration. Using the exemplary combination of Color-Point A in Table 2, the sequence is red, light point 31 . . . blue, light point 32 . . . green, light point 31 . . . red, light point 32 . . . blue, light point 31 . . . green, light point 32.

FIG. 9E shows a fifth flash sequence 45, also at intervals of 140 ms, the light sources D1, D4, D1, D4, etc., are alternately activated, also interspersed with inactive intervals of 140 ms. Again, using the exemplary color combination of Color-Point A in Table 2, the sequence is blue, light point 31 . . . blue, light point 32 . . . blue, light point 31 . . . blue, light point 32, etc. FIG. 9F shows another and sixth flash sequence 46, again at intervals of 140 ms, the light sources D1, D4, D1, D4, etc., are alternately activated, interspersed with inactive intervals of 140 ms. Once again, using the exemplary color combination of Color-Point A in Table 2, the sequence is red, light point 31 . . . red, light point 32 . . . red, light point 31 . . . red, light point 32, etc. FIG. 9G shows still another flash sequence 47, also at intervals of 140 ms, the light sources D2, D6, D2, D6, etc., are alternately activated, interspersed with inactive intervals of 140 ms. Once again, using the exemplary color combination of Color-Point A in Table 2, the sequence is green, light point 31 . . . green, light point 32 . . . green, light point 31 . . . green, light point 32, etc.

In one preferred variation and with particular reference to FIG. 5A, the light-emitting colors of the LED D1 and the LED D4 are the same and are one of red, blue, and green, The combination of D1 and D4 being considered herein as a first light-emitting element. When the first LED D1 and the fourth LED D4 are alternately lit during a certain time interval (for example, not exceeding 20 ms), the human eye cannot recognize the alternate flashing of the first LED D1 and the fourth LED D4 due to the persistence of vision (in this variation, it is a constant or continuous light mode); thereby, the light-emitting effect of the first light-emitting element continuously emitting light is observed, and the light emitted by the first light-emitting element exhibits the light-emitting colors of the first LED D1 and the fourth LED D4. If the light-emitting colors of the first LED D1 and the fourth LED D4 are red, the first light-emitting element exhibits a light-emitting effect of continuous light-emitting, and emits red light.

Of course, the light-emitting colors of the first LED D1 and the fourth LED D4 can also be different, typically each being one of red, blue, and green, respectively. When the first LED D1 and the fourth LED D4 are alternately lit during a particular time interval (for example, a time interval not exceeding 20 ms), the human eye cannot recognize the alternate flashing of the first LED D1 and the fourth LED D4 due to the persistence of vision, thus the light-emitting effect of the first light-emitting element continuously emitting light is observed, and the light emitted by the first light-emitting element exhibits a mixed color of the first LED D1 and the fourth LED D4. If the light-emitting colors of the first LED D1 and the fourth LED D4 are red and blue, respectively, the first light-emitting element exhibits a continuous light-emitting of mixed colors of red and blue.

Similarly, the light-emitting colors of the second LED D2 and the third LED D3, (a second light-emitting element) and light-emitting colors of the fifth LED D5 and the sixth LED D6 (a third light-emitting element) can also be selected in the above manner.

In addition, in some situations where a clear light and dark effect is required, the time interval between the extinction of one LED and the lighting the next LED can be adjusted to overcome the visual persistence, enabling the light strip to be clearly extinguished between the lighting of successive LEDs. For example, the time interval can be set to be no less than 0.5 seconds.

Examples of different light-emitting modes of the light strip are shown in FIGS. 10A to 10L, but those skilled in the art will know that the light-emitting effects of the light strip described above is not limited to the examples shown in FIGS. 10A to 10L. In the sequence shown in FIG. 10E, R1 is the first (red) LED D1, R2 is the second (red) LED D4, together considered the first (red) light-emitting element (R); B1 is the first (blue) LED D5, B2 is the second (blue) LED D6, together considered the second (blue) light-emitting element (B); the third LED D3 is the first (green) LED G1, the fourth LED D4 is the second (green) LED G2, together considered the third (green) light-emitting element (G). Of course, those skilled in the art can also arbitrarily select the colors of the LEDs, and the colors are not limited to the three colors of red, green and blue.

The memory 24 of FIG. 4 as described above holds data defining the flashing mode information respectively corresponding to the flashing modes of the light strip 32, such as the flowing flashing mode control information as shown in FIGS. 9A-9G, the control signal lines L1, L2, and L3 being driven as described above in connection with FIG. 4. More particularly, a first activation of the trigger switch 18 produces a first trigger pulse TG1, initiating the first flash sequence 41 as shown in FIG. 9A, in which there is alternating flashing of the (red) LED light sources D1 and D4, respectively in the first and second light points 31 and 32 of the light set circuit of FIG. 6. A second activation of the trigger switch 18 produces a second trigger pulse TG2 that initiates the second flash sequence 42 as shown in FIG. 9B, in which there is alternating flashing of the (green) LED light sources D2 and D5, again respectively in the first and second light points 31 and 32. Similarly, a third activation of the trigger switch 18 produces a third trigger pulse TG3, initiating the third flash sequence 43 as shown in FIG. 9C, in which there is alternating flashing of the (blue) LED light sources D3 and D6, also respectively in the first and second light points 31 and 32. In like manner, additional activations of the trigger switch 18 can produce fourth, fifth, sixth, and seventh trigger pulses TG4, TG5, TG6, and TG7, for initiating the flash sequences 44, 45, 46, and 47, as respectively shown in FIGS. 9D, 9E, 9F, and 9G.

Of course, those skilled in this field of art can understand that according to the above Table 2, a variety of flashing modes or sequences can also be defined for both the light strip 12 and the light strip 32. The flowing flashing modes mentioned above are only exemplary. Also, any number of the sequences of FIGS. 9A-9G can be stored in the memory 24 of the control apparatus 14, and in any order.

The present invention additionally enables flash sequences in which selected pairs of the light sources of the light set circuit 30 can be simultaneously activated as described below with further reference to FIGS. 10A, 10B, 10C, and 10D. In addition to the individual activations of four different LED light sources as described above in the light set circuit 10 of FIG. 1 and of six different LED light sources in the light set circuit 30 of FIG. 5, the present invention enables simultaneous activation of selected pairs of the LED light sources as described herein with further reference to FIGS. 10A, 10B, 10C, and 10D, and the following Table 3.

tions of this pattern, until interrupted by a subsequent activation of the switch 18 that produces another trigger signal for initiating a different flashing sequence which can be the eighth sequence 51 according to FIG. 10A. FIGS. 10C and 10D show further modes, designated tenth flash sequence 53 and eleventh flash sequence 54, respectively as activated by respective counterpart trigger signals TG3 and TG4, in which light source pairs are activated for extended periods, either terminated by a predetermined elapsed time or by subsequent activations of the trigger switch 18. The tenth flash sequence 53 of FIG. 10C activates the light sources D3 and D6 (both green) indefinitely or for a predetermined period; the eleventh flash sequence 54 of FIG. 10D activated the light sources D2 and D4 (both red), also indefinitely or for a predetermined period, until terminated by a subsequent activation of an ON/Off switch (not shown), which can be connected in series with the BAT terminal (1) of the control chip 16, or through the USB_IN socket 25.

With further reference to FIG. 10E, a red-blue flash sequence 55 cyclically activates the LEDs to emit light in the order of R1*B1→R2*B2 in response to a trigger signal TG5. (The * sign indicates simultaneous light emission.), Each LED has a light-emitting duration of T, the light-emitting interval of the two LEDs before and after is T. In FIG. 10E, T is 140 ms. If the time of one T is used as a

TABLE 3

| State | Control signal line | | | First light point | | | Second light point | | | Colors A (1) (2) | Colors B (1) (2) |
|---|---|---|---|---|---|---|---|---|---|---|---|
| | L1 | L2 | L3 | D1 | D2 | D3 | D4 | D5 | D6 | | |
| State 7 | 0 | 1 | 1 | ✓ | | | | | ✓ | Red-Blu | Red-Grn |
| State 8 | 1 | 0 | 1 | | ✓ | | | ✓ | | Grn-Grn | Grn-Blu |
| State 9 | 1 | 1 | 0 | | | ✓ | ✓ | | | Blu-Red | Blu-Red |
| State 10 | 1 | 0 | 0 | | | ✓ | | | ✓ | Blu-Grn | Blu-Blu |
| State 11 | 0 | 1 | 0 | ✓ | | | ✓ | | | Red-Red | Red-Red |
| State 12 | 0 | 0 | 1 | | ✓ | | | | ✓ | Grn-Blu | Grn-Grn |

Figure 10B:
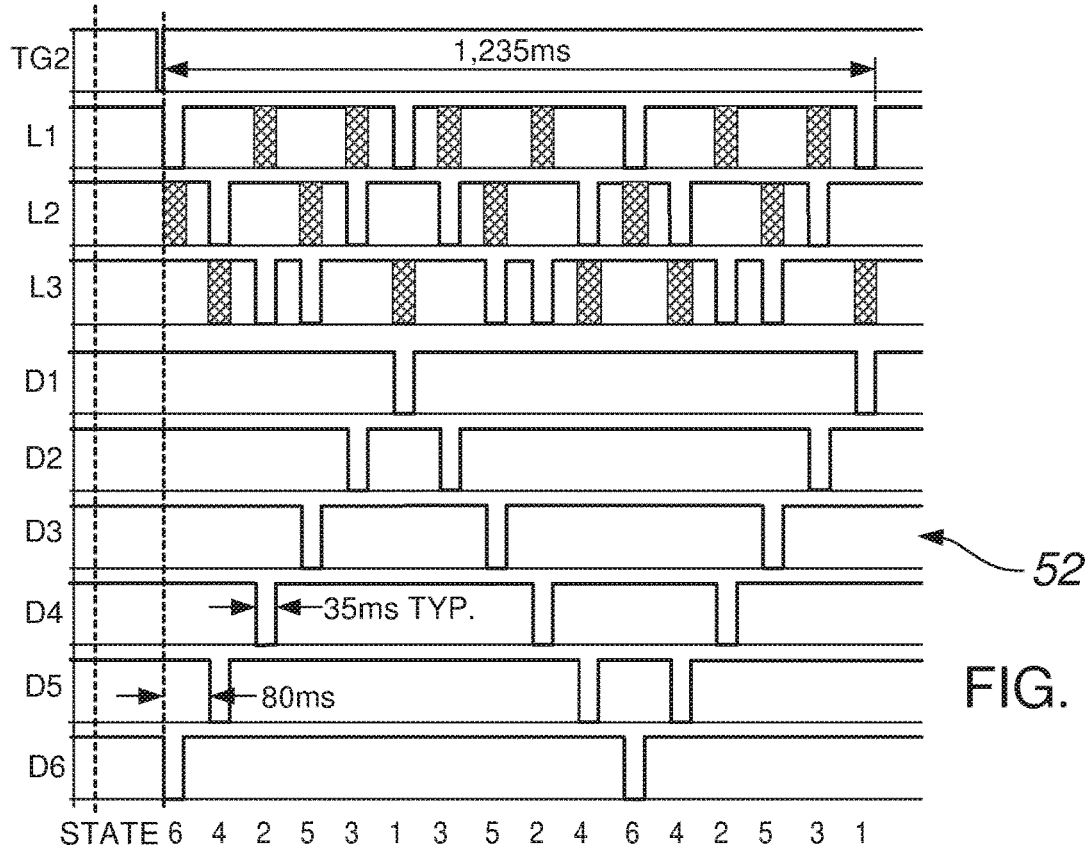
Figure 10E:
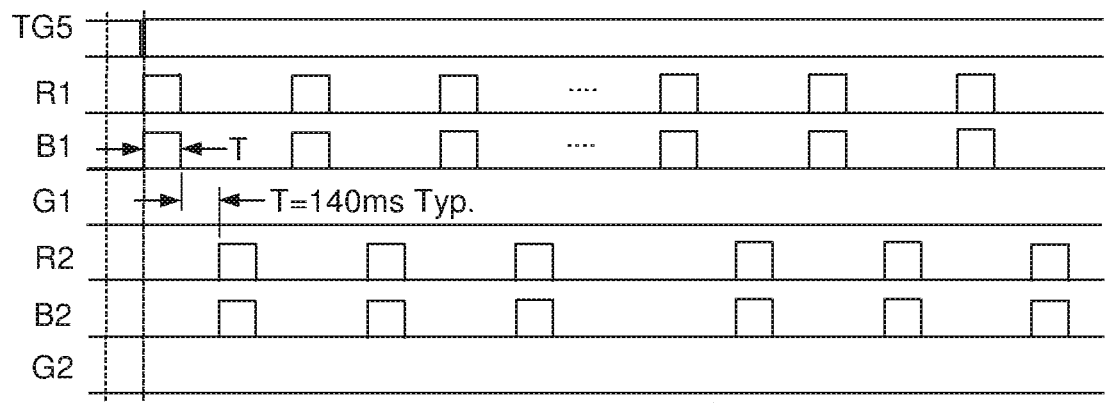
Figure 10F:
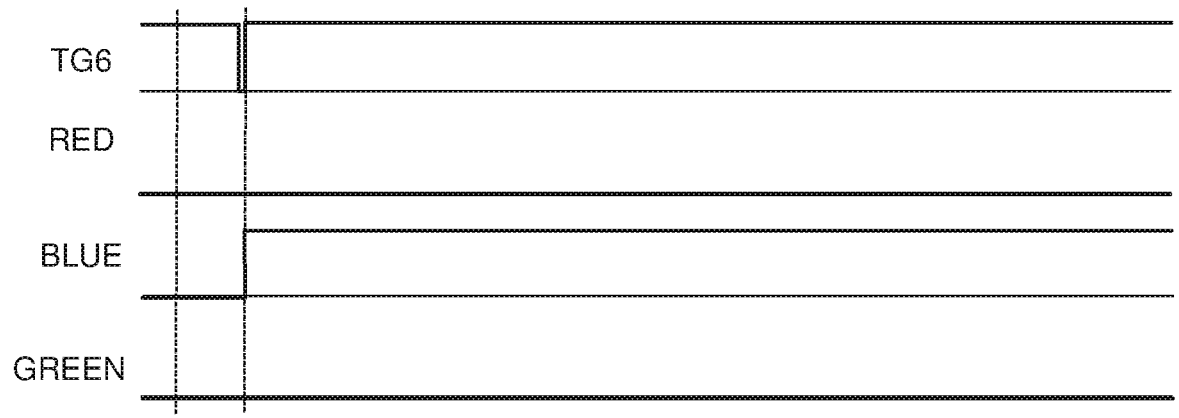
Figure 10G:
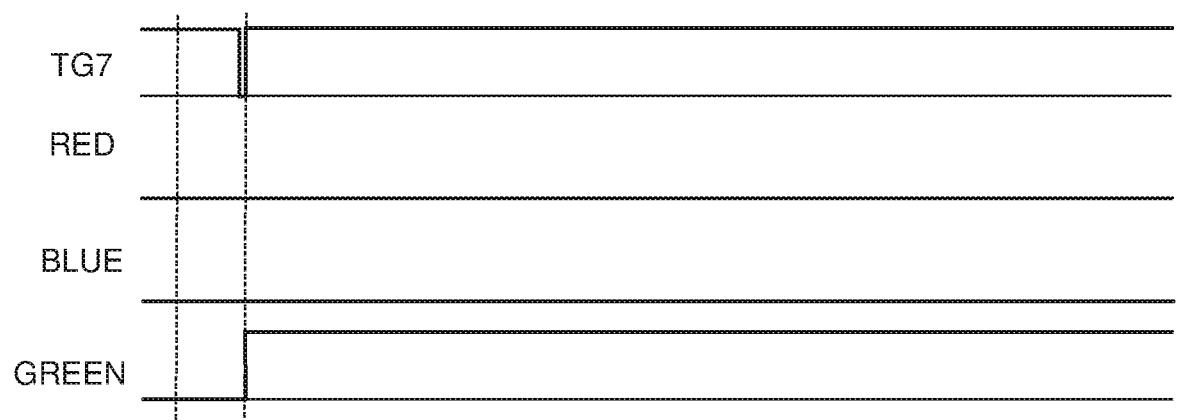
Figure 10H:
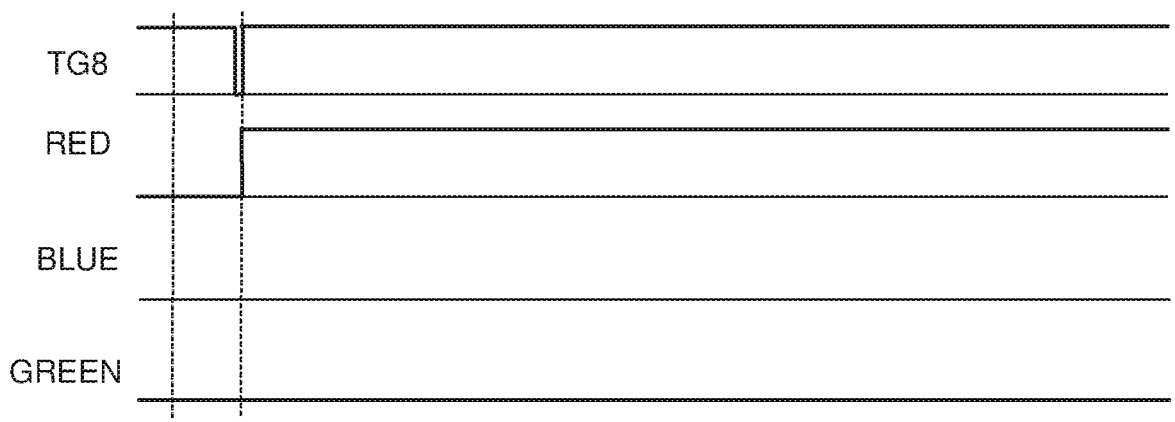
Figure 10I:
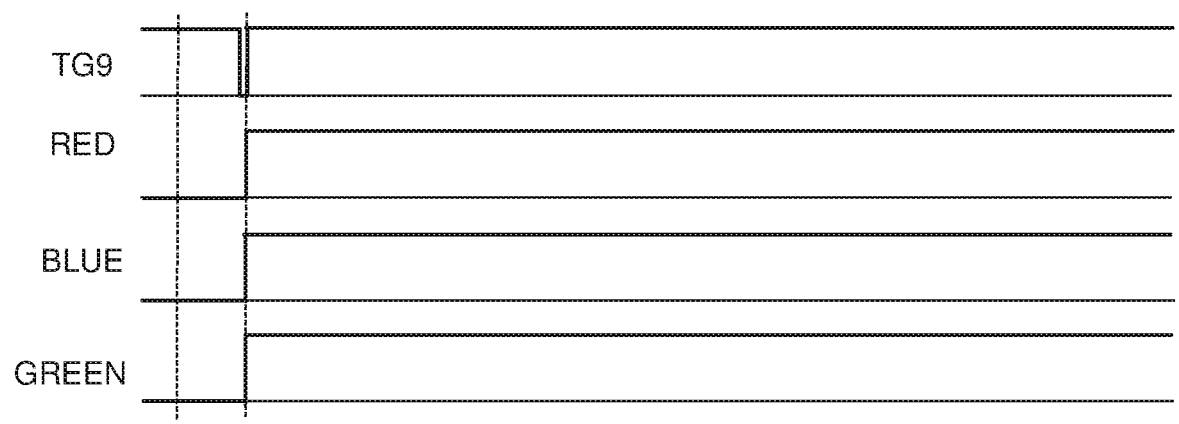
Figure 10J:
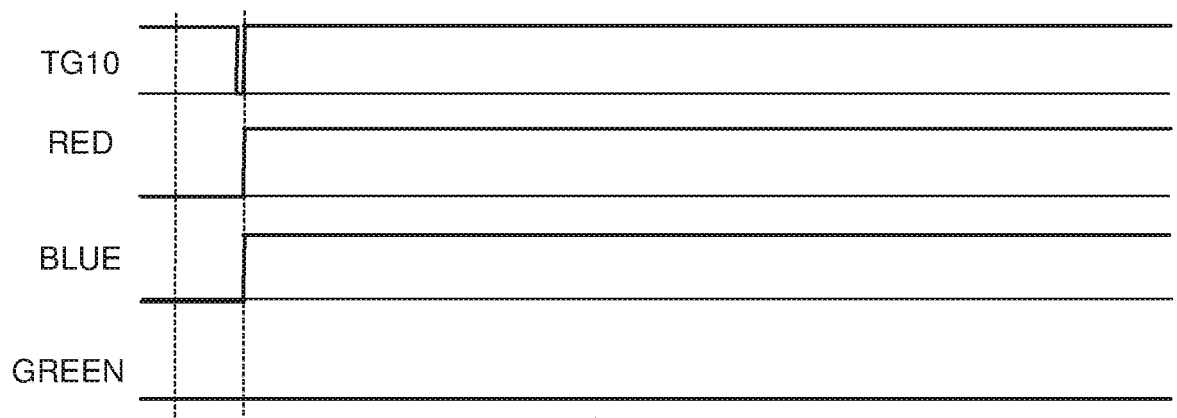

FIGS. 10A, 10B, 10C and 10D show a flash sequence combination in which a first operation of the switch 18 produces a counterpart of the first trigger pulse TG1 that initiates an eighth flash sequence 51 as shown in FIG. 10A in which pairs of the light sources, namely, light sources D3 and D4, D2 and D5, and then D1 and D6 are activated for 35 ms at intervals of 100 ms. This is followed by corresponding activations of the light source pairs D2 and D5, D3 and D4, D1 and D6, D2 and D5, and finally D3 and D4 during an elapsed time of 835 ms. This is accomplished by the control apparatus 14 activating the control signal lines L1, L2, and L3 according to the states 7, 8, and 9 of Table 3 as also indicated in FIG. 10A. The final activation of the pair D3 and D4 can terminate the sequence, or preferably also be the beginning of endless or a predetermined number of repetitions of this pattern, until interrupted by a subsequent activation of the trigger switch 18 that produces a counterpart of the second trigger signal TG2 for initiating a different flashing sequence such as a ninth sequence 52 as shown in FIG. 10B. FIG. 10B shows individual activations which can also be for 35 ms, at intervals of 80 ms. These activations are in the sequence D6, D5, D4, D3, D2, D1, then D2, D3, D4, D5, D6, followed by D5, D4, D3, D2, and D1 during an elapsed time of 1,235 ms. This is accomplished by the control apparatus 14 activating the control signal lines L1, L2, and L3 according to the states 1-6 of Table 2 as also shown in FIG. 10B. The final activation of the light source D1 can terminate the sequence, or preferably also be the beginning of endless or a predetermined number of repeticounting unit, the light-emitting mode shown in FIG. 10E is an odd red and blue mixed light-emitting mode, and the light-emitting mode is a flashing mode. In addition, the LEDs can also emit light cyclically in the order of R1*B2→R2*B1 (the * sign indicates simultaneous light emission as before). Of course, there can also be other two-color light-emitting modes, such as a red-green mixed light-emitting mode, or a blue-green mixed light-emitting mode.

With further reference to FIGS. 10F, 10G, and 10H, pairs of LEDs of the same color alternately flash. FIG. 10F shows a continuous blue color effect 56 produced in response to a trigger signal TG6. The light strip light-emitting mode shown in FIG. 10F is in a trigger period, in which the LEDs B1 and B2 alternately flash, and the time interval between the dark and the next bright between the LEDs B1 and B2 is not more than 0.1 second, thereby the third light-emitting element (B) seems to continue emitting blue light. The light-emitting mode shown in FIG. 10F is thus a blue light monochrome light mode.

Here, "the time interval between the dark and the next bright between the LED B1 and the LED B2" refers to the LED B1 is extinguished, and then LED B2 is lit, or the LED B2 is extinguished, and then the LED B1 is lit. The following descriptions related to FIGS. 10G and 10H below are similar.

FIG. 10G shows a continuous green color effect 57 in response to a trigger signal TG7. In this trigger period the first green LED G1 and the second green LED G2 alternately flash, and the time interval between the dark and the next bright between the first green LED G1 and the second green LED G2 is also not more than 0.1 second, so that the second light-emitting element (G) seems to continue to emit green light. The light-emitting mode shown in FIG. 10G is thus a green light monochrome constant light mode.

FIG. 10H likewise shows a continuous red color effect 58 in response to a trigger signal TG8. In this trigger period the first red LED R1 and the second red LED R2 alternately flash, and the time interval between the dark and the next bright between the first red LED R1 and the second red LED R2 is also not more than 0.1 second, so that the third light-emitting element (R) seems to continue to emit red light. The light-emitting mode shown in FIG. 10H is thus a red light monochrome constant light mode.

With further reference to FIG. 10I, a mixed three-color effect 59 is generated in response to a trigger signal TG9 the first red LED R1 and the second red LED R2 alternately flash, and the time interval between the dark and the next bright between the first red LED R1 and the second LED R2 is not more than 0.1 second; the first blue LED B1 and the second blue LED B2 alternately flash, the time interval between the dark and the next bright between the first blue LED B1 and the second blue LED B2 is not more than 0.1 second; and the first green LED G1 and the second green LED G2 also alternately flash, the time interval between the dark and the next bright between the first green LED G1 and the second green LED G2 being again not more than 0.1 second. The time interval between the dark and the next bright of the first light-emitting element (R) is not more than 0.1 second, and the time interval between the dark and the next bright of the third light-emitting element (B) is not more than 0.1 second, and the time interval between the dark and the next bright of the second light-emitting element (G) is not more than 0.1 second. The light-emitting mode shown in FIG. 21 is thus a red, blue, and green constant mixed light mode.

With further reference to FIG. 10J, a similar constant red and blue mixed light-emitting mode 61 is shown. In one trigger period the first red LED R1 and the second red LED R2 alternately flash, and the time interval between the dark and the next bright between the first red LED R1 and the second red LED R2 is not more than 0.1 second; the first blue LED B1 and the second blue LED B2 alternately flash, and the time interval between the dark and the next bright between the first blue LED B1 and the second blue LED B2 is not more than 0.1 second; the time interval between the dark and the next bright of the first light-emitting element (R) is not more than 0.1 second, and the time interval between the dark and the next bright of the third light-emitting element (B) is not more than 0.1 second.

With further reference to FIG. 10K, another constant mixed light-emitting mode provides, in one trigger period, the first red LED R1 and the second red LED R2 alternately flash, and the time interval between the dark and the next bright between the first red LED R1 and the second red LED R2 is not more than 0.1; the first green LED G1 and the second green LED G2 alternately flash, and the time interval between the dark and the next bright between the first green LED G1 and the second green LED G2 is not more than 0.1; the time interval between the dark and the next bright of the first light-emitting element (R) is not more than 0.1 second, and the time interval between the dark and the next bright of the second light-emitting element (G) is not more than 0.1 second. The light-emitting mode shown in FIG. 21 is thus a red and green mixed light constant light mode.

With further reference to FIG. 10L, yet a different mixed sequence 62 is provided in a triggering period, wherein the light strip emits light cyclically in the order of the first light-emitting element (R)→the third light-emitting element (B)→the second light-emitting element (G). Each light-emitting element is activated for a duration T, and there is no delay between two light-emitting activations. In FIG. 10L, exemplary activation durations T are 140 ms, resulting in a three-color alternating light-emitting mode without gaps, and the light-emitting mode is a flashing mode. Of course, the order of activations can alternatively be red, green, blue; green red blue; green, blue, red; blue, green, red; or blue, red, green. Of course, the light-emitting duration T can also have other values depending on specific applications.

By setting the light-emitting durations of the LEDs, the bright and dark frequency of the LEDs can be controlled, so that the light strip exhibits different visual effects. For example, in the odd blue monochrome light-emitting mode shown in FIG. 9E, the light-emitting interval of the two LEDs R1 and R2 before and after can be adjusted by the input device, so that the light-emitting interval is not recognized by the human eye, and the visual effect shown in FIG. 9E is the same as shown in FIG. 10H. The light-emitting duration is set by the input device, and in the interval between light-emitting intervals, no voltage is applied to the LED, thereby saving energy.

With further reference to FIGS. 11, 18, 19, 20, and 21, the present invention provides a greatly increased variety of control options with the addition of one or more control signal lines. With particular reference to FIG. 11, a counterpart of the light strip combination, designated load strip combination 20", includes a counterpart of the control apparatus, designated 14", which can drive a plurality N of control lines, wherein N is a natural number greater than or equal to 3, individual ones of the control signal lines being designated L1, L2, L3, . . . LN. In FIG. 11, the control apparatus 14" includes any suitable power supply 15. The control signal lines are coupled to a counterpart of the light strip, designated load set circuit 40 in which an array of electrical load sets can have individual loads thereof independently activated.

For example, FIG. 18 shows a light strip combination 100 including a counterpart of the control apparatus, designated 114 having a counterpart of the control chip, designated 116, with four control signal lines L1, L2, L3, and L4 driving a counterpart of the load set circuit, designated light set circuit 130. The light set circuit 130 is shown having LEDs D1 and D2 as a group (as described above and shown in FIG. 13) reverse-connected between the control signal lines L1 and L2, LEDs D3 and D4 reverse-connected between the control signal lines L2 and L3, LEDs D5 and D5 reverse-connected between the control signal lines L3 and L4, LEDs D7 and D8 reverse-connected between the control signal lines L1 and L3, LEDs D9 and D10 reverse-connected between the control signal lines L2 and L4, and LEDs D11 and D12 reverse-connected between the control signal lines L1 and L4. As indicated in the following Table 4 and FIG. 19, each of the LEDs D1-D12 can be singly activated in a third following flash sequence 71 using just the four signal control lines L1, L2, L3, and L4.

The LED light sources D1-D4 are also designated S1-S4, respectively, being referenced that way in connection with FIG. 26, described below.

TABLE 4

| TIME STATE | CONTROL LINE | | | | LIGHT-EMITTING DIODE | | | | | | | | | | | |
|---|---|---|---|---|---|---|---|---|---|---|---|---|---|---|---|---|
| | L1 | L2 | L3 | L4 | D1 | D2 | D3 | D4 | D5 | D6 | D7 | D8 | D9 | D10 | D11 | D12 |
| 1 | 1 | 0 | — | — | ✓ | | | | | | | | | | | |
| 2 | 0 | 1 | — | — | | ✓ | | | | | | | | | | |
| 3 | — | 1 | 0 | — | | | ✓ | | | | | | | | | |
| 4 | — | 0 | 1 | — | | | | ✓ | | | | | | | | |
| 5 | — | — | 1 | 0 | | | | | ✓ | | | | | | | |
| 6 | — | — | 0 | 1 | | | | | | ✓ | | | | | | |
| 7 | 1 | — | 0 | — | | | | | | | ✓ | | | | | |
| 8 | 0 | — | 1 | — | | | | | | | | ✓ | | | | |
| 9 | — | 1 | — | 0 | | | | | | | | | ✓ | | | |
| 10 | — | 0 | — | 1 | | | | | | | | | | ✓ | | |
| 11 | 1 | — | — | 0 | | | | | | | | | | | ✓ | |
| 12 | 0 | — | — | 1 | | | | | | | | | | | | ✓ |

It will be understood that this four-line control apparatus provides significant advantages over the above-described three-line embodiments of FIGS. 1-10, whether or not the LEDs D11 and D12 are included, or even whether the LEDs D9 and 10 are also omitted, in that with the addition of the fourth control line L4 two additional LEDs D7 and D8 can be individually activated. It will be further understood that only one of the LEDs of particular such groups could be included and still be within the scope of the present invention. For example, in the light set circuit of FIG. 6, D6 could be left out as long as D3 remains.

As described above in connection with the configuration of FIGS. 5A, 6, and Table 3, the present invention in the four-line embodiment FIG. 18 additionally enables flash sequences in which more than one of the light sources (or other electrical loads) of the light set circuit 40 can be simultaneously activated as described below with further reference to Table 5. In addition to the individual activations of up to 12 different LED light sources in the light set circuit 130 of FIG. 18, the present invention enables simultaneous activation of selected pairs, triplets, and quadruplets of the LED light sources as described. For example, the LED pair of D1 and D4 is simultaneously activated in State 13 by driving the control signal lines L1 and L3 high, L2 low and keeping L4 in a floating state. In another example, the LEDs D2, D4, and D9 are simultaneously activated in State 26 by driving the control signal line L2 high with L1, L3, and L4 held low. Further, the LEDs D3, D7, D9, and D11 are simultaneously activated by driving the control signal lines L1 and L2 high while holding L3 and L4 low.

TABLE 5

| | Control line | | | | Light-emitting diode | | | | | | | | | | | |
|---|---|---|---|---|---|---|---|---|---|---|---|---|---|---|---|---|
| State | L1 | L2 | L3 | L4 | D1 | D2 | D3 | D4 | D5 | D6 | D7 | D8 | D9 | D10 | D11 | D12 |
| 13 | 1 | 0 | 1 | — | ✓ | | | ✓ | | | | | | | | |
| 14 | 1 | 0 | 0 | — | ✓ | | | | | | ✓ | | | | | |
| 15 | 1 | 0 | — | 1 | ✓ | | | | | | | | | ✓ | | |
| 16 | 1 | 0 | — | 0 | ✓ | | | | | | | | | | ✓ | |
| 17 | 1 | 0 | 0 | 1 | ✓ | | | | | | ✓ | ✓ | | ✓ | | |
| 18 | 1 | 0 | 0 | 0 | ✓ | | | | | | ✓ | | | | ✓ | |
| 19 | 1 | 0 | 1 | 1 | ✓ | | | ✓ | | | | | | ✓ | | |
| 20 | 1 | 0 | 1 | 0 | ✓ | | | ✓ | ✓ | | | | | ✓ | | |
| 21 | 0 | 1 | 1 | — | | ✓ | | | | | | | ✓ | | | |
| 22 | 0 | 1 | 0 | — | | ✓ | ✓ | | | | | | | | | |
| 23 | 0 | 1 | — | 1 | | ✓ | | | | | | | | | | ✓ |
| 24 | 0 | 1 | — | 0 | | ✓ | | | | | | | ✓ | | | |
| 25 | 0 | 1 | 0 | 1 | | ✓ | ✓ | | | | | ✓ | | | | ✓ |
| 26 | 0 | 1 | 0 | 0 | | ✓ | ✓ | | | | | | ✓ | | | |
| 27 | 0 | 1 | 1 | 1 | | ✓ | | | | | | | ✓ | | | ✓ |
| 28 | 0 | 1 | 1 | 0 | | ✓ | | | ✓ | | | | ✓ | ✓ | | |
| 29 | 1 | — | 0 | 1 | | | | | | | ✓ | ✓ | | | | |
| 30 | 1 | — | 0 | 0 | | | | | | | ✓ | | | | ✓ | |
| 31 | — | 0 | 0 | 1 | | | ✓ | | | | | | | ✓ | | |
| 32 | — | 0 | 1 | 0 | | | ✓ | ✓ | | | | | | | | |
| 33 | 1 | 1 | 0 | 1 | ✓ | | | | | | ✓ | ✓ | | | | |
| 34 | 1 | 1 | 1 | 0 | ✓ | | | | ✓ | | | | | ✓ | | |
| 35 | 1 | 1 | 0 | — | ✓ | | | | | | ✓ | | | | | |
| 36 | 0 | 0 | 1 | — | | | | ✓ | | | | ✓ | | | | |
| 37 | 0 | 0 | — | 1 | | | | | | | | | | ✓ | | ✓ |
| 38 | 1 | 1 | — | 0 | | | | | | | | | | ✓ | ✓ | |
| 39 | 0 | — | 0 | 1 | | | | | | | | | | | | |
| 40 | 0 | — | 1 | 0 | | | | | | | | | | | | |
| 41 | — | 1 | 0 | 1 | ✓ | | | | | | ✓ | | | | | |
| 42 | — | 1 | 1 | 0 | | | | | | | ✓ | | | ✓ | | |
| 43 | 1 | 1 | 0 | 0 | ✓ | | | | | | ✓ | | | | | |
| 44 | — | 1 | 0 | 0 | ✓ | | | | | | ✓ | | | | | |

With further reference to FIGS. 20 and 21, the present invention provides a particularly low-cost implementation of cascading sequences wherein a plurality of LEDs or other light sources appear to be activated simultaneously, with trailing light sources being inactivated at the rear of the plurality as new ones are activated up front. In one example, the LEDs D1-D10 of the combination of FIG. 18 are activated in a cascading sequence 72 wherein four LEDs at a time appear to be activated, with trailing ones being inactivated as new ones are activated ahead. During an interval T of 100 ms, for example, any of the LEDs D1-D10 can be activated separately ten times for 1 ms at a time in ten sub-intervals T' of 10 ms each (at a frequency f' of 100 Hz), a total of 100 such 1 ms activations. The activations of particular ones of the LEDs D1-D10 are staggered as shown in FIG. 21, only one LED at a time being activated, yet four appearing to be activated due to visual persistence as described above. More particularly, in response to a trigger pulse TG13, each of the LEDs ate pulsed during four consecutive periods of the 100 ms interval T, the process repeating any desired number of times or as interrupted by another trigger pulse as described above.

The interval T is also the time between successive advancements of the LED activations, so that, in the exemplary timing diagrams of FIGS. 20 and 21, once a particular plurality of four LEDs are apparently activated, a new leading one is activated 100 ms later, 90 ms following a final 1 ms activation of a previously trailing apparently activated LED. It will be further understood that if T' is increased to 12 ms the full complement of LEDs D1-D12 can be included in a counterpart of the sequence 72 of FIGS. 20 and 21. Further, other numbers of apparently simultaneous activations greater than or less than four are possible within the scope of the present invention, as well as different numbers of control signal lines (N=3, 4, or 5). Moreover, the direction of cascading can be reversible.

With particular reference to FIG. 22, FIG. 23, and Table 6, the present invention provides a much greatly increased variety of control options with the addition of another control signal line. FIG. 22 shows a light strip combination 102 including a counterpart of the control chip, designated 118, with five control signal lines L1, L2, L3, L4, and L5 driving a counterpart of the load set circuit, designated light set circuit 132. The light set circuit 132 is shown having the LEDs D1, D2, D3, D4, D5, D6, D7, D8, D9, D10, D11, and D12 connected as before described regarding FIG. 18. Further, LEDs D13 and D14 as a group (again as described above and shown in FIG. 13) reverse-connected between the control signal lines L3 and L4, LEDs D15 and D16 reverse-connected between the control signal lines L3 and L5, LEDs D17 and D18 reverse-connected between the control signal lines L2 and L4, and LEDs D19 and D20 reverse-connected between the control signal lines L1 and L5.

As indicated in the following Table 6 and FIG. 23, each of the LEDs D1-D20 can be singly activated using just the five signal control lines L1, L2, L3, L4, and L5. It will be understood that this five-line control apparatus provides significant advantages over the above-described three-line and four-line embodiments of FIGS. 1-18, whether or not any of the LEDs D17 through D20 are included, or even whether particular ones of the other LEDs D1 through D16 are also omitted, in that with the addition of the fifth control line L5 four additional LEDs D17, D18, D19, and D20 can be individually activated. It will be further understood that only one of the LEDs of particular such groups could be included to be within the scope of the present invention.

TABLE 6

| TIME STATE | CONTROL LINE | | | | | LIGHT-EMITTING DIODE | | | | | | |
|---|---|---|---|---|---|---|---|---|---|---|---|---|
| | L1 | L2 | L3 | L4 | L5 | D1 | D2 | D3 | D4 | D5 | D6 | D7 |
| T1 | 1 | 0 | — | — | — | ✓ | | | | | | |
| T2 | 0 | 1 | — | — | — | | ✓ | | | | | |
| T3 | — | 1 | 0 | — | — | | | ✓ | | | | |
| T4 | — | 0 | 1 | — | — | | | | ✓ | | | |
| T5 | — | — | 1 | 0 | — | | | | | ✓ | | |
| T6 | — | — | 0 | 1 | — | | | | | | ✓ | |
| T7 | 1 | — | 0 | — | — | | | | | | | ✓ |
| T8 | 0 | — | 1 | — | — | | | | | | | |
| T9 | — | 1 | — | 0 | — | | | | | | | |
| T10 | — | 0 | — | 1 | — | | | | | | | |
| T11 | 1 | — | — | 0 | — | | | | | | | |
| T12 | 0 | — | — | 1 | — | | | | | | | |
| T13 | — | — | — | 1 | 0 | | | | | | | |
| T14 | — | — | — | 0 | 1 | | | | | | | |
| T15 | — | — | 1 | — | 0 | | | | | | | |
| T16 | — | — | 0 | — | 1 | | | | | | | |
| T17 | — | 1 | — | — | 0 | | | | | | | |
| T18 | — | 0 | — | — | 1 | | | | | | | |
| T19 | 1 | — | — | — | 0 | | | | | | | |
| T20 | 0 | — | — | — | 1 | | | | | | | |

| TIME STATE | LIGHT-EMITTING DIODE | | | | | | | | | | | | |
|---|---|---|---|---|---|---|---|---|---|---|---|---|---|
| | D8 | D9 | D10 | D11 | D12 | D13 | D14 | D15 | D16 | D17 | D18 | D19 | D20 |
| T1 | | | | | | | | | | | | | |
| T2 | | | | | | | | | | | | | |
| T3 | | | | | | | | | | | | | |
| T4 | | | | | | | | | | | | | |
| T5 | | | | | | | | | | | | | |
| T6 | | | | | | | | | | | | | |
| T7 | | | | | | | | | | | | | |
| T8 | ✓ | | | | | | | | | | | | |

TABLE 6-continued

| | | | | | | | |
|---|---|---|---|---|---|---|---|
| T9 | ✓ | | | | | | |
| T10 | | ✓ | | | | | |
| T11 | | | ✓ | | | | |
| T12 | | | ✓ | | | | |
| T13 | | | | ✓ | | | |
| T14 | | | | ✓ | | | |
| T15 | | | | | ✓ | | |
| T16 | | | | | ✓ | | |
| T17 | | | | | | ✓ | |
| T18 | | | | | | ✓ | |
| T19 | | | | | | | ✓ |
| T20 | | | | | | | ✓ |

As described above in connection with the configuration of FIG. 5A, FIG. 6, and Table 3, and FIG. 18 and Table 5, the present invention in the five-line embodiment of FIG. 19 additionally enables flash sequences in which more than one of the light sources (or other electrical loads) of the light set circuit 40 can be simultaneously activated as described above, with further examples being apparent to those having ordinary skill in the art. In one such example, the LEDs D1, D4, D5, D14, and D18 are simultaneously activated in a fourth following flash sequence 81 by driving the control signal lines L1 L3, and L5 high with L2 and L4 held low.

As further described herein, and with further reference to FIGS. 24 and 25, a light-emitting assembly 140 includes a cover 141 having a top wall 142, a light-emitting cavity 143 being formed thereunder and bounded by a side wall 144. Optionally, the cover 141 can include an expansion ring 145 extending outwardly from the side wall 144. As shown in FIG. 25, the light-emitting cavity 143, as well as the side wall 144 are preferably circular. The expansion ring 145 can be circular as also shown In FIG. 25, but it can have other shapes. The casing 141 is preferably made of TPU (Thermoplastic Urethane, thermoplastic polyurethane elastomer) material, which is convenient for processing and shaping, with a certain degree of softness or elasticity for easy installation. A bottom surface 146 of the cover casing 141 can be flat as shown in FIG. 24, and the expansion ring 145 can extend from a lower part of the side wall 144.

The light-emitting assembly 140 also includes an array of light sources 147 mounted on a back plate 148 that fits flush within the light-emitting cavity 143 as shown in FIG. 24, the light sources being within the cavity 143 and proximate the side wall 144, the back plate 148 blocking light from escaping the cavity 143 past the bottom surface 146. Also, a reflective layer can be provided on the top surface of the back plate 148. In addition, the top wall 142 can be made fully or partially opaque by including a mask 149 or coating thereon or within the cavity 143 as shown in FIG. 24, so that the light is primarily emitted through the side wall 144 Of the cover casing 141.

In this representative configuration there are a total of 16 light sources 147 in four sets 150A, 150B, 150C, and 150D of four light sources each, themselves designated S1, S2, S3, and S4 respectively, as also designated in FIG. 1. The light-emitting assembly 140 can be driven by the Operation of this configuration can be for activation of the light sources to sequentially light up, turn off sequentially, or individually light up one by one. Patterns of activation can thus depict rotation as of a wheel with swirling flames. Control circuitry for this configuration is shown and described in connection with FIGS. 1 and 2 above.

In another variation of the present invention, and with further reference to FIGS. 26-28, a counterpart of the light-emitting assembly, designated 160, includes counterparts of the cover casing 141 having a total of 12 light sources 147 that are individually designated E1-E12 in the circuit diagram of FIG. 18. A particularly advantageous pattern of activation for depicting rotation with swirling flames is shown in FIG. 27. In that representative pattern the light source 147 designated E1 is activated for five intervals T of time, which can be 58 ms each. After the first such interval, the light source 147 designated E2 is activated for five such intervals. After the second such interval, the light source 147 designated E3 is also activated for five intervals, and after the third interval the light source 147 designated E4 is again activated for five intervals. After the fourth interval T, the light source 147 designated E5 is activated for only four intervals; and after the fifth interval T the light source 147 designated E6 is also activated for four intervals. After the sixth interval T the light source 147 designated E7 is activated for three intervals, and after the seventh interval T the light source 147 designated E8 is also activated for three intervals. After the eighth interval T the light source 147 designated E9 is activated for two intervals, and after the ninth interval T the light source 147 designated E10 is also activated for two intervals. After the tenth interval T the light source 147 designated E11 is activated for only one interval, and after the eleventh interval T the light source 147 designated E12 is again activated for only one interval. It will be understood that this sequence can be repeated in response to a single occurrence of a trigger signal, and it can also be reversed.

The above-described sequence of FIG. 27 includes overlapping instances of apparent simultaneous activations of reverse polarity-connected LED light sources, obtained by alternating activations at rates above visual perception as described above.

As shown in FIG. 28, a shoe 164 can have the light-emitting assembly 160 mounted thereon and connected to the control apparatus 114 of FIG. 18. Optionally, a counterpart of the mask, designated 149', can be secured externally on the top surface 142 of the cover 141 instead of within the cavity 143. The mask 149' can have a pattern of openings 165 for passing some illumination therethrough.

With further reference to FIGS. 29-32, yet another implementation of the present invention includes a light-emitting assembly 170 having a bottom plate 171 (a flexible circuit board) on which are a plurality of light-emitting bodies 172, and a light-transmitting body 173. The light-emitting bodies 172 are connected to a controller (not shown), there being suitable electrical paths on the circuit board. The light-emitting bodies 172 are preferably LEDs, and more preferably at least some have RGB (three color) elements. The light transmitting body 173 has a pattern of light-transmitting gaps, slits or slots 174 formed therethrough. It will be understood that as used herein the term "slot" includes any form of gap, including geometrical shapes such as starshaped, triangular, circular, and slots forming letters. In one variation the light-transmitting slots 174 extend to the bottom plate 171, counterparts of the light-emitting bodies 172 being imbedded in the light-transmitting body 173 as shown in FIGS. 31 and 32. In this variation the light-transmitting body 173 preferably has an outer surface covering 175. The covering can be opaque, being penetrated by the slots 174, or partially opaque for diffusing light coming out of the slots 174.

The light-transmitting slots 174 are arranged in one or more slot patterns 176 which can be text or graphics, there being for example five such patterns, designated 176A, 176B, 176C, 176D and 176E, as shown In FIG. 29, these being, for example, representations of the English letters L, I, G, H, and T, respectfully. Below a slot pattern 176 of the light-transmitting body 173, one or more of the light-emitting bodies 172 can be correspondingly arranged, and the light emitted by the light-emitting body or bodies 172 can be emitted out through an associated slot pattern 176. As shown in FIG. 31, two of the light-emitting bodies 172 can be arranged under the pattern 176B, spaced on opposite sides of the light-transmitting slot 174. As shown in FIG. 32, three of the light-emitting bodies can be arranged under the pattern 176D, spaced on opposite sides of the light-emitting slots 174. It will be understood that any of the slot patterns 176 can have joined (as in the pattern 176A) or separate (as in a lower-case English i) slot portions. It will also be understood that if the light transmitting body 173 were to be an opaque component, the light-emitting bodies 172 would have to be located directly under the light-transmitting slots 174, and the covering 175, if present, can be clear or partially clear, and covering at least one slot pattern 176 for excluding moisture from the light transmitting body 173.

In a preferred variation of this implementation, and with further reference to FIGS. 33 and 34, a counterpart of the light-transmitting body, designated 173', has one or more counterparts of the luminous cavity 143, designated 143', formed therein, the light-emitting bodies 172 within the body 173' being located within the one or more of the cavities 143'. As shown in FIG. 33, two of the light-emitting bodies 172 can be arranged under the pattern 176B, spaced on opposite sides of the light-transmitting slit 174. As shown in FIG. 33, three of the light-emitting bodies can be arranged under the pattern 176D, spaced on opposite sides of the light-emitting slits 174. Thus, light emitted from the light-emitting bodies 173 is more efficiently transmitted through the light-emitting slits 174. A further improved display effect can be obtained by providing a reflective layer or film on the bottom plate as described above in connection with the light-emitting assembly 140.

In this variation, the light-transmitting coating on the light-transmitting body 173 covers at least one slot pattern 176, being a diffuse reflection film that diffusely reflects the light emitted from the light-emitting slits 174, for a softer visual effect. There can be differently formulated coatings over different ones of the light-transmitting slits 174, it being understood that a single such coating covering the outer surface of the light-transmitting body 173 is easier to process and manufacture.

In these embodiments of the present invention the controller can activate the light-emitting bodies 172 in a variety of ways. For example, FIG. 30 shows 12 light-emitting bodies 172 that are located internally of the light-transmitting body 173. If each of the light-emitting bodies 172 within this region have a single LED color, they can be individually activated using the light set circuit 130 of FIG. 18 as described above. Alternatively, if the light-emitting bodies 172 serving the five respective slot patterns 176A-176E shown in FIG. 29 are connected in parallel, the respective slot patterns can be individually activated using the light set circuit of FIG. 1 having only three control signal lines. Further, if these light-emitting bodies 172 have three-color elements, there being fifteen sets of such elements, the respective slit patterns can be individually activated using the light set circuit of FIG. 19 having five control signal lines.

FIGS. 29 and 30 show 20 light-emitting bodies that are located externally of the light-transmitting body 173. If each of these external light-emitting bodies 172 have a single LED color, they can be individually activated using the light set circuit 132 of FIG. 19 having an additional five control lines as described above. If these light-emitting bodies 172 have three-color elements, alternating ones of such light-emitting bodies can be individually activated using the light set circuit 30 of FIG. 6 and the arrangement of FIG. 8 using only three additional control signal lines.

Although the present invention has been described in considerable detail with reference to certain preferred versions thereof, other versions are possible. Therefore, the spirit and scope of the appended claims should not necessarily be limited to the preferred versions contained herein.

What is claimed is:

1. A light-emitting electrical apparatus comprising:
   a) a set of at least four LED light sources and a plurality of control signal lines, first and second ones of the LED light sources being polarized and connected in reverse polarity with each other between two of the control signal lines, a third one of the LED light sources being polarized and connected between one of the first and second ones of the LED light sources and an additional control signal line of the plurality of control signal lines, whereby:
      i) one of the first and second LED light sources is independently selectively activated when opposite signals are applied between the first and second control signal lines with the third control signal line being kept in a floating state;
      ii) the other of the first and second LED light sources is independently selectively activated when the signals are reversed with the additional control signal line remaining in the floating state; and
      iii) the third LED light source is independently selectively activated when opposite signals are applied between the one of the two LED light sources and the additional control signal line, the other of the two control signal lines being kept in a floating state;
   b) a housing assembly having a casing and a back plate, the first, second and third light sources being mounted on the back plate; and
   c) means for directing light from ones of the LED light sources to exit the casing in particular directions for producing predetermined lighting effects.

2. The light-emitting electrical apparatus of claim 1, further comprising a fourth LED light source, the fourth one of the LED light sources being polarized and connected between the additional control signal line of the control signal lines and one of the two control signal lines, the connections between the third and fourth LED light sources to the additional control signal line of the control signal lines being of opposite polarity to each other, whereby the fourth LED light source is independently selectively activated when the opposite signals applied between the one of the two LED light sources and the additional control signal line are reversed, the other of the two control signal lines being kept in a floating state.

3. The light-emitting electrical apparatus of claim 2, wherein each LED light source has a positive terminal and a negative terminal, the positive terminal of the first LED light source being connected to the additional control signal line, and the negative terminal of the first LED light source being connected to the second control signal line, the positive terminal of the second LED light source being connected to the second control signal line, the negative terminal of the second LED light source being connected to the additional control signal line, the positive terminal of the third LED light source being connected to the first control signal line, the negative terminal of the third LED light source being connected to the second control signal line, the positive terminal of the fourth LED light source being connected to the additional control signal line, and the negative terminal of the fourth LED light source being connected to the first control signal line.

4. The light-emitting electrical apparatus of claim 1, further comprising a plurality of set circuits, the plurality of set circuits having equal complements of the LED light sources and corresponding connections to the control signal lines.

5. The light-emitting electrical apparatus of claim 1, in combination with a control apparatus having control outputs that are respectively connected to the plurality of control signal lines, the control apparatus being configured for selectively applying opposite signals of selected polarity between the two control signal lines, the additional control signal line being in a floating state, and alternatively, applying opposite signals of selected polarity between one of the two and the additional control signal lines, the other of the two control signal lines being in a floating state.

6. The light-emitting combination of claim 5, wherein the control apparatus comprises a memory, a control pulse generating circuit and a processor, the memory being connected to the processor for storing flashing mode control information for the LED light sources, the processor transferring the flashing mode control information from the memory to the control pulse generating circuit, the control pulse generating circuit sending corresponding pulse control signals to the control signal lines.

7. The light-emitting combination of claim 6, wherein the control apparatus further comprises an I/O port and a trigger switch connected to the I/O port, the processor responding to a switching signal of the trigger switch for initiating a flashing sequence of LED activations.

8. The light-emitting combination of claim 7, wherein initiating the flashing sequence comprises transferring flashing mode control information of a different flashing mode from the memory to the control pulse generating circuit.

9. The light-emitting combination of claim 7, wherein the trigger switch is the flicker switch.

10. The light-emitting combination of claim 6, wherein at least one of the flashing modes is a following flashing mode.

11. The light-emitting electrical apparatus of claim 1, having a plurality of set circuits of at least three LED light sources, wherein the set circuits are connected along three control signal lines only.

12. The light-emitting electrical apparatus of claim 1, the casing having a top wall and a luminous cavity formed between the back plate and the top wall, a side wall of the casing extending between the top wall and the back plate, wherein the means for directing light comprises the casing being formed of a transparent or translucent material, at least some light emitted from the LED light sources exits the side wall of the casing.

13. The light-emitting electrical apparatus of claim 12, comprising a plurality of at least 3 sets of LED light sources on the back plate and spaced along and proximate the side wall.

14. The light-emitting electrical apparatus of claim 12, comprising at least 12 of the LED light sources being spaced along and proximate the side wall.

15. The light-emitting electrical apparatus of claim 14 in combination with a control apparatus connected to the plurality of control signal lines for activating the LED light sources on a following sequence wherein at least some reverse-connected pairs of the LED light sources appear to be activated simultaneously, the activations being at a frequency above visual perception.

16. The light-emitting electrical apparatus of claim 12, wherein the casing further comprises an expansion ring extending outwardly from a lower portion of the side wall for receiving some of the light exiting the side wall.

17. The light-emitting electrical apparatus of claim 14, wherein the at least 12 LED light sources are in reverse-polarity-connected pairs, being in sets of up to four of the LED light sources, the LED light sources of each set being selectively activated from three control lines only.

18. The light-emitting electrical apparatus of claim 13, having up to 16 LED light sources in four sets.

19. The light-emitting electrical apparatus of claim 5, in further combination with an article of clothing.

20. The light-emitting electrical apparatus of claim 19, wherein the article of clothing is a shoe.

21. The light-emitting electrical apparatus of claim 1, wherein the means for directing light comprises the casing having a slot formed therethrough for directing at least a portion of the light from at least one of the LED light sources to exit through the slot.

22. The light-emitting electrical apparatus of claim 21, a pair of the LED light sources being spaced oppositely from the slot.

23. The light-emitting electrical apparatus of claim 21, the casing having a luminous cavity formed between the back plate and a top wall, the slot extending through the top wall.

24. The light-emitting electrical apparatus of claim 21, wherein the slot forms a pattern.

25. The light-emitting electrical apparatus of claim 24, wherein the pattern depicts an alphabetic letter.

26. The light-emitting electrical apparatus of claim 25, comprising a plurality of alphabetic letter patterns forming a word.

27. A light-emitting electrical apparatus comprising:
a) a set of at least four LED light sources and a plurality of control signal lines, first and second ones of the LED light sources being polarized and connected in reverse polarity with each other between two of the control signal lines, a third one of the LED light sources being polarized and connected between one of the first and second ones of the LED light sources and an additional control signal line of the plurality of control signal lines, whereby:
  i) one of the first and second LED light sources is independently selectively activated when opposite signals are applied between the first and second control signal lines with the third control signal line being kept in a floating state;
  ii) the other of the first and second LED light sources is independently selectively activated when the signals are reversed with the additional control signal line remaining in the floating state; and iii) the third LED light source is independently selectively activated when opposite signals are applied between the one of the two LED light sources and the additional control signal line, the other of the two control signal lines being kept in a floating state;

b) a housing assembly having a casing and a back plate, the first, second and third light sources being mounted on the back plate, the casing having a top wall and a luminous cavity formed between the back plate and the top wall, a side wall of the casing extending between the top wall and the back plate, at least 12 of the LED light sources being spaced and proximate the side wall; and c) means for directing light from ones of the LED light sources to exit the casing in particular directions for producing predetermined lighting effects, comprising the casing being formed of a transparent or translucent material, at least some light emitted from the LED light sources exiting the side wall of the casing, the casing further comprising an expansion ring extending outwardly from a lower portion of the side wall for receiving some of the light exiting from the side wall.

28. A light-emitting electrical apparatus comprising:

a) a set of at least four LED light sources and a plurality of control signal lines, first and second ones of the LED light sources being polarized and connected in reverse polarity with each other between two of the control signal lines, a third one of the LED light sources being polarized and connected between one of the first and second ones of the LED light sources and an additional control signal line of the plurality of control signal lines, whereby:

i) one of the first and second LED light sources is independently selectively activated when opposite signals are applied between the first and second control signal lines with the third control signal line being kept in a floating state;

ii) the other of the first and second LED light sources is independently selectively activated when the signals are reversed with the additional control signal line remaining in the floating state; and iii) the third LED light source is independently selectively activated when opposite signals are applied between the one of the two LED light sources and the additional control signal line, the other of the two control signal lines being kept in a floating state;

b) a housing assembly having a casing and a back plate, the first, second and third light sources being mounted on the back plate; and c) means for directing light from ones of the LED light sources to exit the casing in particular directions for producing predetermined lighting effects, comprising the casing having a slot formed therethrough for directing at least a portion of the light from at least one of the LED light sources to exit through the slot, a pair of the LED light sources being spaced oppositely from the slot, the slot forming a pattern.

* * * * *